(12) United States Patent
Vian et al.

(10) Patent No.: US 9,251,698 B2
(45) Date of Patent: Feb. 2, 2016

(54) FOREST SENSOR DEPLOYMENT AND MONITORING SYSTEM

(71) Applicant: The Boeing Company, Chicago, IL (US)

(72) Inventors: John Lyle Vian, Renton, WA (US); Charles B. Spinelli, Bainbridge Island, WA (US); Brian J. Tillotson, Kent, WA (US); George Michael Roe, Seattle, WA (US); Joshua Przybylko, Boston, MA (US)

(73) Assignee: THE BOEING COMPANY, Chicago, IL (US)

( * ) Notice: Subject to any disclaimer, the term of this patent is extended or adjusted under 35 U.S.C. 154(b) by 225 days.

(21) Appl. No.: 13/708,543

(22) Filed: Dec. 7, 2012

(65) Prior Publication Data
US 2014/0077969 A1 Mar. 20, 2014

Related U.S. Application Data

(63) Continuation-in-part of application No. 13/622,739, filed on Sep. 19, 2012.

(51) Int. Cl.
G08B 21/00 (2006.01)
G08C 17/02 (2006.01)
H04Q 9/00 (2006.01)

(52) U.S. Cl.
CPC .................. *G08C 17/02* (2013.01); *H04Q 9/00* (2013.01); *H04Q 2209/40* (2013.01); *H04Q 2209/50* (2013.01); *H04Q 2209/80* (2013.01); *H04Q 2209/886* (2013.01)

(58) Field of Classification Search
CPC ..... G08B 25/009; H04W 84/18; G06Q 10/06; G08C 17/02
USPC ............ 340/521, 531, 577, 628, 999; 169/43, 169/52; 382/203; 705/28
See application file for complete search history.

(56) References Cited

U.S. PATENT DOCUMENTS

| 5,036,935 A | 8/1991 | Kohara |
| 5,220,263 A | 6/1993 | Onishi et al. |
| 5,324,948 A | 6/1994 | Dudar et al. |
| 5,487,440 A | 1/1996 | Seemann |
| 5,832,187 A | 11/1998 | Pedersen et al. |
| 5,845,725 A | 12/1998 | Kawada |

(Continued)

FOREIGN PATENT DOCUMENTS

| CN | 201876969 U | 6/2011 |
| EP | 1193168 A2 | 4/2002 |

(Continued)

OTHER PUBLICATIONS

Vian, "Vehicle Base Station," U.S. Appl. No. 12/814,322, filed Jun. 11, 2010, 57 pages.

(Continued)

*Primary Examiner* — Mark Rushing
(74) *Attorney, Agent, or Firm* — Yee & Associates, P.C.

(57) ABSTRACT

A method and apparatus for managing a location. Soil sensor units are deployed in the location in a forest from a group of aerial vehicles. Information is generated about a number of soil conditions in the location in the forest using the soil sensor units in the location. The information is transmitted from the soil sensor units to a remote location for analysis.

20 Claims, 19 Drawing Sheets

(56) References Cited

U.S. PATENT DOCUMENTS

| | | | |
|---|---|---|---|
| 5,963,733 | A | 10/1999 | Howard |
| 6,364,026 | B1 | 4/2002 | Doshay |
| 6,671,588 | B2 | 12/2003 | Otake et al. |
| 6,792,684 | B1 | 9/2004 | Hyyppa |
| 6,904,335 | B2 | 6/2005 | Solomon |
| 6,984,952 | B2 | 1/2006 | Peless et al. |
| 7,218,993 | B2 | 5/2007 | Yasukawa et al. |
| 7,236,861 | B2 | 6/2007 | Paradis et al. |
| 7,250,849 | B2 | 7/2007 | Spriggs et al. |
| 7,327,112 | B1 | 2/2008 | Hlynka et al. |
| 7,337,156 | B2 | 2/2008 | Wippich |
| 7,501,616 | B2 | 3/2009 | Wiklof |
| 7,765,038 | B2 | 7/2010 | Appleby et al. |
| 7,765,668 | B2 | 8/2010 | Townsend et al. |
| 7,813,888 | B2 | 10/2010 | Vian et al. |
| 7,844,364 | B2 | 11/2010 | McLurkin et al. |
| 7,894,948 | B2 | 2/2011 | Stroud |
| 8,060,270 | B2 | 11/2011 | Vian et al. |
| 8,075,257 | B2 | 12/2011 | Tien et al. |
| 8,078,319 | B2 | 12/2011 | Franke et al. |
| 8,086,351 | B2 | 12/2011 | Gaudiano et al. |
| 8,849,475 | B1 | 9/2014 | Sudolsky et al. |
| 2003/0018431 | A1* | 1/2003 | Hanson ............................ 702/5 |
| 2004/0030571 | A1 | 2/2004 | Solomon |
| 2004/0158358 | A1 | 8/2004 | Anezaki et al. |
| 2005/0113943 | A1 | 5/2005 | Nian |
| 2005/0126794 | A1 | 6/2005 | Palmer et al. |
| 2006/0176169 | A1* | 8/2006 | Doolin et al. ................. 340/521 |
| 2006/0271251 | A1 | 11/2006 | Hopkins |
| 2007/0038395 | A1* | 2/2007 | Green et al. .................... 702/62 |
| 2007/0080863 | A1* | 4/2007 | Glockler et al. .............. 342/463 |
| 2007/0129847 | A1 | 6/2007 | Ulmer et al. |
| 2007/0208442 | A1 | 9/2007 | Perrone |
| 2007/0266800 | A1 | 11/2007 | Risk |
| 2008/0004749 | A1 | 1/2008 | Hostettler |
| 2008/0129495 | A1* | 6/2008 | Hitt .......................... 340/539.26 |
| 2009/0024493 | A1 | 1/2009 | Huang et al. |
| 2009/0079839 | A1 | 3/2009 | Fischer et al. |
| 2009/0195396 | A1* | 8/2009 | Ballester Merelo et al. . 340/601 |
| 2009/0205845 | A1* | 8/2009 | Hoffman ......................... 169/43 |
| 2009/0219393 | A1 | 9/2009 | Vian et al. |
| 2009/0285491 | A1 | 11/2009 | Ravenscroft et al. |
| 2010/0023201 | A1 | 1/2010 | Kinney et al. |
| 2010/0271191 | A1 | 10/2010 | de Graff et al. |
| 2010/0312387 | A1 | 12/2010 | Jang et al. |
| 2010/0312388 | A1 | 12/2010 | Jang et al. |
| 2011/0313685 | A1* | 12/2011 | Geirnaert et al. ............... 702/41 |
| 2012/0114185 | A1 | 5/2012 | Ram et al. |
| 2012/0149353 | A1* | 6/2012 | Helfrich ........................ 455/418 |
| 2012/0253740 | A1 | 10/2012 | Rojas |
| 2012/0261144 | A1 | 10/2012 | Saad et al. |
| 2013/0081245 | A1 | 4/2013 | Vavrina et al. |

FOREIGN PATENT DOCUMENTS

| | | |
|---|---|---|
| EP | 2511888 | 10/2012 |
| GB | 2429819 | 3/2007 |
| WO | 9629597 | 9/1996 |
| WO | WO2004081488 A2 | 9/2004 |
| WO | WO2007080584 A2 | 7/2007 |
| WO | WO2009142933 A2 | 11/2009 |
| WO | WO2010141180 A2 | 12/2010 |

OTHER PUBLICATIONS

Vian et al., "Forestry Management System," U.S. Appl. No. 13/622,739, filed Sep. 9, 2012, 66 pages.

Vian et al., "Aerial Forest Inventory System," U.S. Appl. No. 13/712,165, filed Dec. 12, 2012, 66 pages.

Vian et al., "Forest Metrology System," U.S. Appl. No. 13/712,237, filed Dec. 12, 2012, 68 pages.

"In-Sight Line Scan Vision System," Webinar, COGNEX, copyright 2010, 17 pages, retrieved Feb. 5, 2010 http://www.cognex.com.

"Unmanned Aerial Vehicle (UAV) ZALA 421-04M chosen for Aerial Monitoring of Forest Fires," published by news.wood.ru, Feb. 2010, 3 pages.

Frost, "A Practical Guide to Using the In-Sight 5604 Line Scan Vision System—Integration Note," Mar. 23, 2009, In-Sight Vision Systems, COGNEX, 20 pages.

Ollero, "Multiple Heterogenous Unmanned Aerial Vehicles," Springer Tracts in Advanced Robotics, vol. 37, copyright 2007, 233 pages (abstract).

International Search Report and Written Opinion, dated Apr. 4, 2013, regarding Application No. PCT/US2013/054355, 12 pages.

Extended European Search Report, dated May 9, 2014, regarding Application No. EP13196125.2, 5 pages.

Merino et al., "An Unmanned Aircraft System for Automatic Forest Fire Monitoring and Measurement," Journal of Intelligent & Robotic Systems, vol. 65, No. 1-4, Jan. 2012, pp. 533-548.

Ollero et al., "Unmanned Aerial Vehicles as tools for forest-fire fighting," V International Conference on Forest Fire Research, D.X. Viegas (Ed.), 2006, 11 pages.

Final Office Action, dated May 27, 2014, regarding U.S. Appl. No. 13/622,739, 32 pages.

"Echo Wireless Vibration Monitoring System," PCB Group, Inc., copyright 2014, 2 pages. Accessed Jan. 28, 2014, https://www.imi-sensors.com/Echo_Wireless.aspx?gclid=CLLo3-mvjbwCFaE9QgodYwUAaQ.

"Precision Sensing Components & Systems," SignalQuest Precision Microsensors, copyright 1999-2014, SignalQuest, LLC., 5 pages. Accessed Feb. 5, 2014, http://signalquest.com/products.

"G-Link—LXRS," LORD MicroStrain, copyright 2013, 2 pages. Accessed Jan. 28, 2014, http://www.microstrain.com/wireless/g-link.

Office Action, dated Nov. 21, 2013, regarding U.S. Appl. No. 13/622,739, 44 pages.

Office Action, dated Feb. 11, 2015, regarding U.S. Appl. No. 13/622,739, 35 pages.

Notice of Allowance, dated Apr. 16, 2015, regarding U.S. Appl. No. 13/622,739, 14 pages.

Canadian Intellectual Property Office Examination Search Report, dated Oct. 15, 2014, regarding Application No. 2,829,914, 4 pages.

Canadian Intellectual Property Office Examination Search Report, dated Jun. 1, 2015, regarding Application No. 2,829,914, 3 pages.

Australian Government IP Australia Patent Examination Report No. 1, dated Jan. 30, 2015, regarding Application No. 2013245429, 3 pages.

* cited by examiner

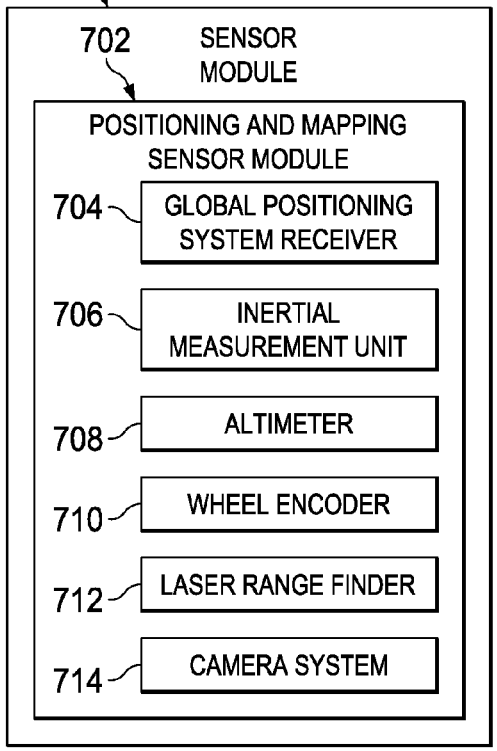
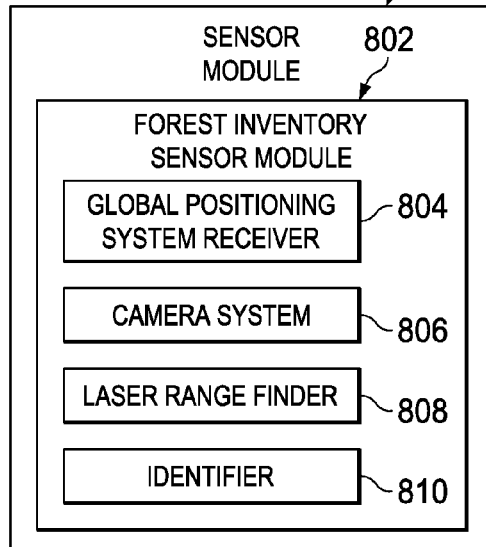
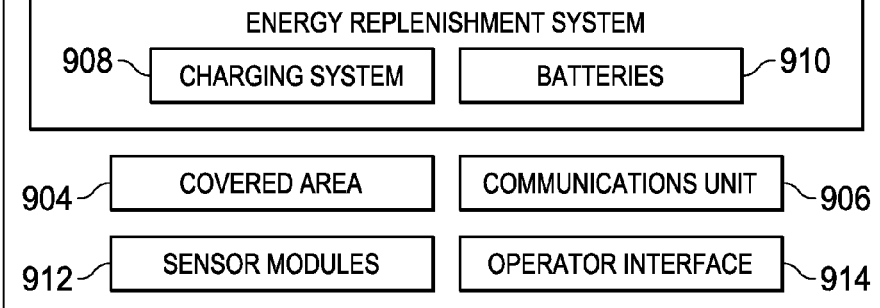
FIG. 9

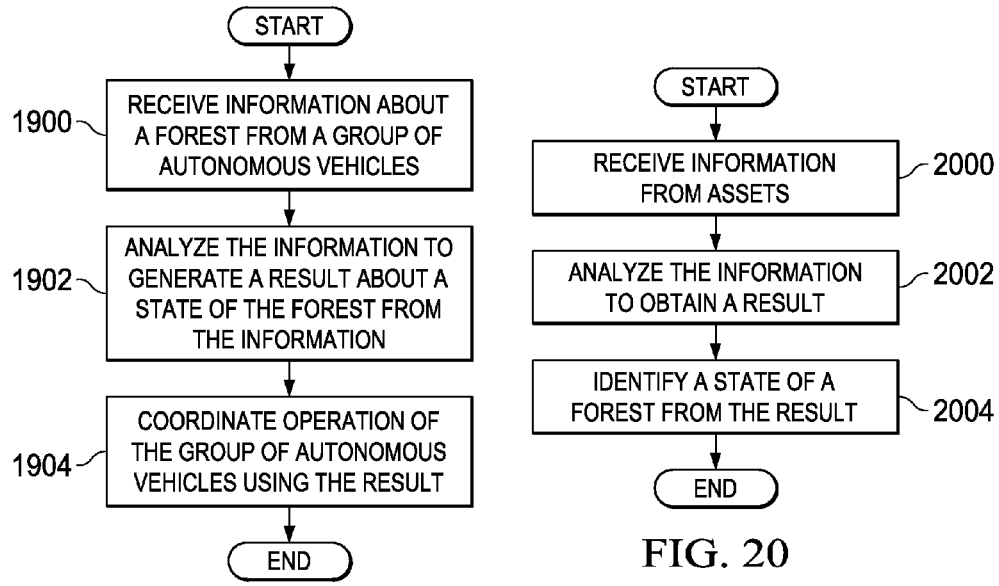
FIG. 19
FIG. 20
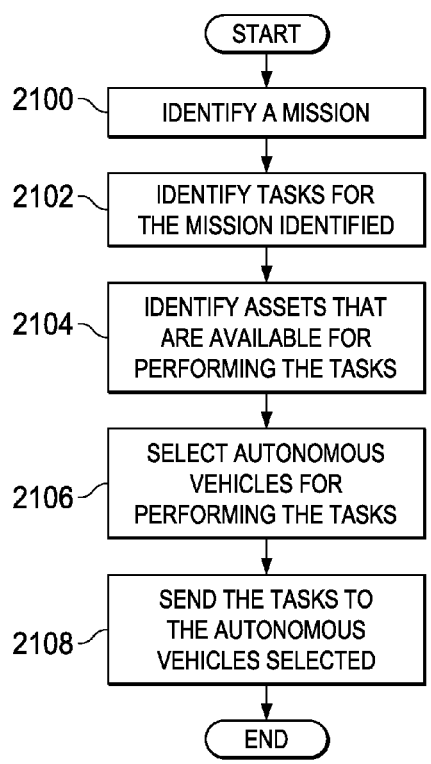
FIG. 21

FIG. 27
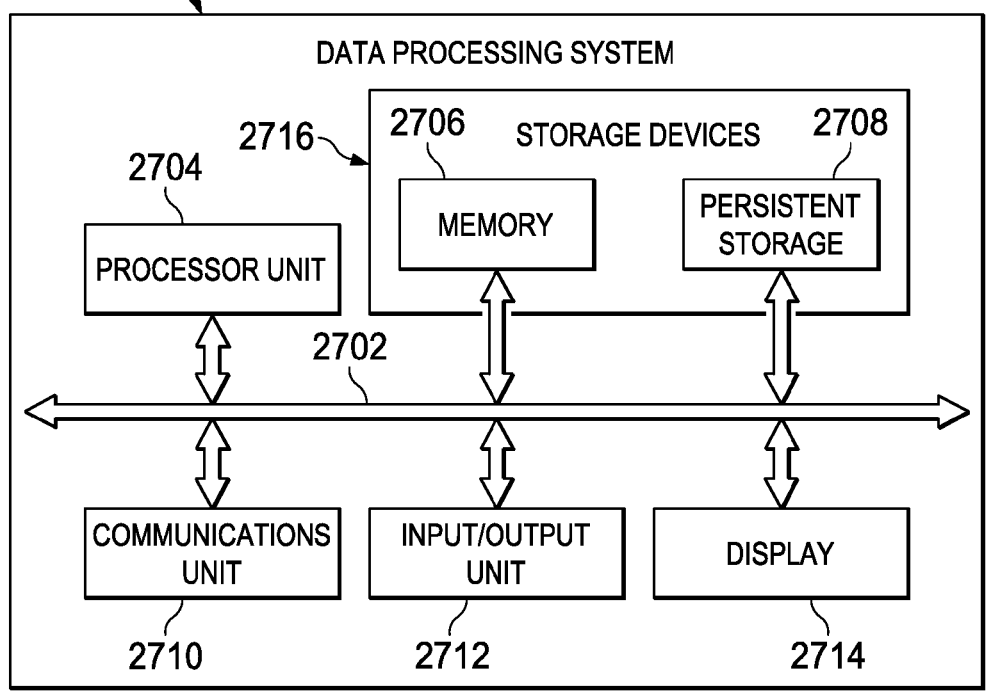
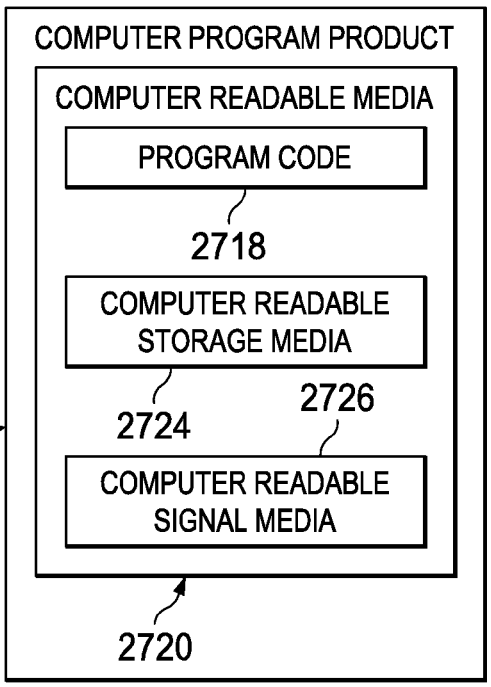

FOREST SENSOR DEPLOYMENT AND MONITORING SYSTEM

CROSS-REFERENCE TO RELATED APPLICATION

This application is a continuation-in-part of patent application U.S. Ser. No. 13/622,739, filed Sep. 19, 2012, entitled "Forestry Management System," which is incorporated herein by reference.

BACKGROUND INFORMATION

1. Field

The present disclosure relates generally to forest management and, in particular, to forest management operations. Still more particularly, the present disclosure relates to a method and apparatus for performing forest management operations.

2. Background

Forestry management is a branch of forestry that includes many different aspects. These aspects may include environmental, economic, administrative, legal, and social aspects of managing a forest. Forestry management may consist of various techniques such as timber extraction, planting trees, replanting trees, cutting roads and pathways through forests, preventing fires in a forest, maintaining the health of the forest, and other suitable activities.

When performing these and other operations with respect to forest management, collecting information about the forest may be desired. For example, collecting information about the forest provides an ability to analyze the state of the forest as well as identify operations that may be performed.

The tools used to generate information for assessing the state of a forest may include, for example, without limitation, a clinometer, a data recorder, an increment borer, a wedge prism, a diameter tape, a global positioning system device, a tally meter, a laptop computer, and other suitable tools. These tools are used by forestry management personnel to perform various operations such as estimating numbers of trees present in an area, identifying the health of trees, identifying the age of trees, identifying tree spacing, identifying composition of soil samples, and other suitable operations.

With this information, an analysis of the information may be made to identify a state of the forest. This state of the forest may be a forest inventory. This forest inventory may provide results such as the value of the timber, expected cash flows from the timber, the amount of timber land existing, impacts of recreational use, risks of fire, improvements to increase the growth and value of the forest, the time period in which timber should be harvested, and other suitable results.

Currently, the process for collecting information for assessing the state of a forest is very time-consuming and complex. For example, collecting information may require tens of thousands or hundreds of thousands of sensor readings or observations made by forest management personnel for a particular location in the forest. With additional locations, even more information is collected. Moreover, collecting this information within desired time periods and as frequently as desired increases the time and effort needed.

Further, current processes also often rely on sampling when collecting information. Sampling may be performed in selected locations instead of from the entire forest. This type of information collection may be used when obtaining information over the whole forest and is more time-consuming than desired. Further, when sampling, errors may occur due to a lack of adequate information collection and analysis.

The collection of information is performed by forest management personnel using tools that often may require interpretation by the forest management personnel. As a result, different human operators may make different interpretations while making measurements. The lack of consistency of interpretations may lead to undesired results.

For example, two different people may decide that different types of samplings should be used based on two different measurements of tree spacing. As another example, when using a clinometer, measurement of the height of a tree using two different clinometers may produce different results. These differences may provide results that may not be as accurate as desired.

Further, the information may be inconsistent depending on the ability of forest management personnel to reach different portions of the forest. For example, access to certain locations within the forest may be infeasible for forestry management personnel. In these inaccessible regions, the information may be unavailable and as a result the state of the forest may not be identified as accurately as desired.

Additionally, the availability of forest management personnel to collect information may not be as great as desired in order to obtain a desired amount of information for performing an analysis. Additionally, this analysis may not be performed with a desired level of accuracy or with the use of as up-to-date information as desired.

As a result, collecting information needed to analyze the state of the forest is often much more complex and difficult than desired. With the number of pieces of information needed and the frequency at which the information is needed, the amount of forest management personnel needed to obtain this information may be infeasible due to the amount of personnel available or the costs associated with use of these personnel. Further, with the use of human operators to make measurements and observations, the information collected may not be as uniform or as accurate as desired.

Therefore, it would be desirable to have a method and apparatus that takes into account at least some of the issues discussed above, as well as other possible issues.

SUMMARY

In one illustrative embodiment, a forestry management system comprises a forestry manager. The forestry manager is configured to receive information relating to a number of soil conditions for a location in a forest from a sensor system deployed by a group of aerial vehicles and identify a mission based on the number of soil conditions.

In another illustrative embodiment, a forestry management system comprises sensor units and a group of aerial vehicles. The sensor units are configured to be deployed in a location, generate information about a number of soil conditions in the location, and transmit the information using wireless communications links. The group of aerial vehicles is configured to carry the sensor units and deploy the sensor units in the location.

In yet another illustrative embodiment, a method for managing a location is presented. Soil sensor units are deployed in the location in a forest from a group of aerial vehicles. Information is generated about a number of soil conditions in the location in the forest using the soil sensor units in the location. The information is transmitted from transmitters in the soil sensor units to a remote location for analysis.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a block diagram of a positioning and map building sensor module in accordance with an illustrative embodiment;

FIG. 8 is an illustration of a block diagram of a sensor module in accordance with an illustrative embodiment;

FIG. 9 is an illustration of a block diagram of a support system in accordance with an illustrative embodiment;

FIG. 19 is an illustration of a flowchart of a process for managing a forest in accordance with an illustrative embodiment;

FIG. 20 is an illustration of a flowchart of a process for processing information received from assets in accordance with an illustrative embodiment;

FIG. 21 is an illustration of a flowchart of a process for coordinating the operation of assets in accordance with an illustrative embodiment;

FIG. 27 is an illustration of a block diagram of a data processing system in accordance with an illustrative embodiment.

DETAILED DESCRIPTION

The illustrative embodiments recognize and take into account one or more different considerations. For example, the illustrative embodiments recognize and take into account that the currently used systems for collecting information about a forest may not provide as much information or as accurate information as desired for performing forestry management.

Thus, the illustrative embodiments provide a method and apparatus for managing a forest. In one illustrative embodiment, a forestry manager is configured to receive information about a forest from a group of autonomous vehicles. The forestry manager analyzes the information to generate a result about a state of the forest. The forestry manager also coordinates the operation of the group of autonomous vehicles using the result.

Figure 1:
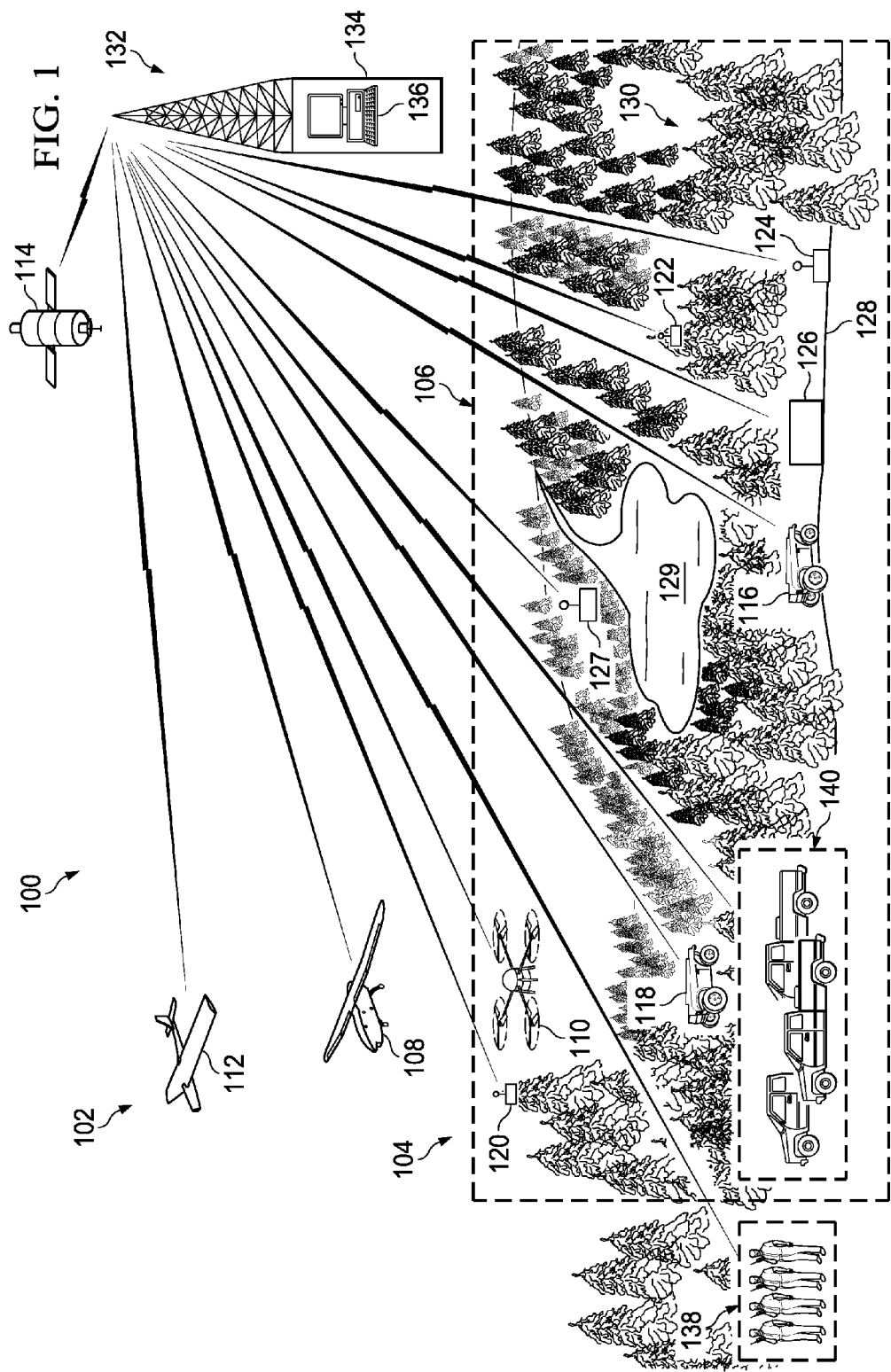
FIG. 1 is an illustration of a forestry management environment in accordance with an illustrative embodiment.

With reference now to the figures and, in particular, with reference to FIG. 1, an illustration of a forestry management environment is depicted in accordance with an illustrative embodiment. As depicted, forestry management environment 100 includes assets 102.

Assets 102 generate information about locations in forest 104 such as location 106. In this illustrative example, assets 102 include unmanned vehicles such as unmanned aerial vehicle 108, unmanned aerial vehicle 110, unmanned aerial vehicle 112, satellite 114, unmanned ground vehicle 116, and unmanned ground vehicle 118. Additionally, assets 102 also may include sensor systems such as ground-based sensor unit 120, ground-based sensor unit 122, ground-based sensor unit 124, and ground-based sensor unit 127. Support system 126 also may be present to provide support for the unmanned vehicles.

As depicted, unmanned aerial vehicle 108 and unmanned aerial vehicle 110 may operate at lower altitudes as compared to unmanned aerial vehicle 112. For example, unmanned aerial vehicle 108 and unmanned aerial vehicle 110 may operate from ground 128 of forest 104 up to altitudes of about 2,000 feet in these illustrative examples. Unmanned aerial vehicle 112 may operate at higher altitudes such as altitudes over 30,000 feet depending on the particular implementation.

As depicted, unmanned aerial vehicle 108, unmanned aerial vehicle 110, and unmanned aerial vehicle 112 use onboard sensors to generate information about location 106 in forest 104. Satellite 114 also may use onboard sensors to generate information about location 106 in forest 104.

In these illustrative examples, unmanned ground vehicle 116 and unmanned ground vehicle 118 may move on ground 128 of forest 104. Unmanned ground vehicle 116 and unmanned ground vehicle 118 also may generate information about location 106 in forest 104 using onboard sensors.

Additionally, ground-based sensor unit 120, ground-based sensor unit 122, ground-based sensor unit 124, and ground-based sensor unit 127 are present in location 106 in forest 104 and also generate information about location 106 in forest 104. In these illustrative examples, ground-based sensor unit 120 and ground-based sensor unit 122 may be placed in trees 130. Ground-based sensor unit 124 may be located on ground 128 in forest 104.

In some illustrative examples, ground-based sensors may be operated near water. In these illustrative examples, ground-based sensor unit 127 may be placed near body of water 129. In these illustrative examples, ground-based sensor unit 127 may be used to measure the water quality of body of water 129.

In these illustrative examples, support system 126 may be a stationary structure or a mobile structure. For example, support system 126 may be a base, a station, a van, or other structure that provides support for at least one of unmanned aerial vehicle 108, unmanned aerial vehicle 110, unmanned ground vehicle 116, and unmanned ground vehicle 118 to recharge batteries, exchange batteries, or otherwise obtain power to operate.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C.

Additionally, support system 126 also may provide shelter from the environment, repair facilities, and provide other services to one or more of unmanned aerial vehicles or unmanned ground vehicles. In this illustrative example, support system 126 may operate in an automated fashion without need for human intervention. In some cases, support system 126 also may store information that may be generated by unmanned aerial vehicle 108, unmanned aerial vehicle 110, unmanned ground vehicle 116, or unmanned ground vehicle 118.

The information generated by assets 102 may be sent over wireless communications links 132 to control station 134. Forestry manager 136 in control station 134 is configured to process the information generated by assets 102.

Additionally, forestry manager 136 also may coordinate the operation of assets 102 in these illustrative examples. This coordination may include directing the movement of assets 102, identifying locations in forest 104 for monitoring, and other suitable operations that may be performed by assets 102. In some illustrative examples, forestry manager 136 and the components in forestry manager 136 may be distributed between control station 134 and other components in forestry management environment 100.

For example, forestry manager 136 may be distributed between control station 134 and support system 126. For example, a portion of forestry manager 136 may be located in support system 126 while another portion of forestry manager 136 may be located in control station 134. In this case, the components in forestry manager 136 may be in communication with each other over wireless communications links 132.

In other illustrative examples, forestry manager 136 may be distributed within computers in assets 102. For example, forestry manager 136 may be distributed in control station 134, unmanned aerial vehicle 112, and unmanned ground vehicle 116.

In some illustrative examples, assets 102 also may include personnel 138 and manned vehicles 140. Personnel 138 and manned vehicles 140 may supplement operations performed by the unmanned assets in these illustrative examples. Additionally, forestry manager 136 also may provide directions to at least one of personnel 138 and manned vehicles 140 to coordinate the operation of these assets. In this manner, the operation of different assets, both unmanned assets and manned assets, are coordinated by forestry manager 136 in control station 134.

Figure 2:
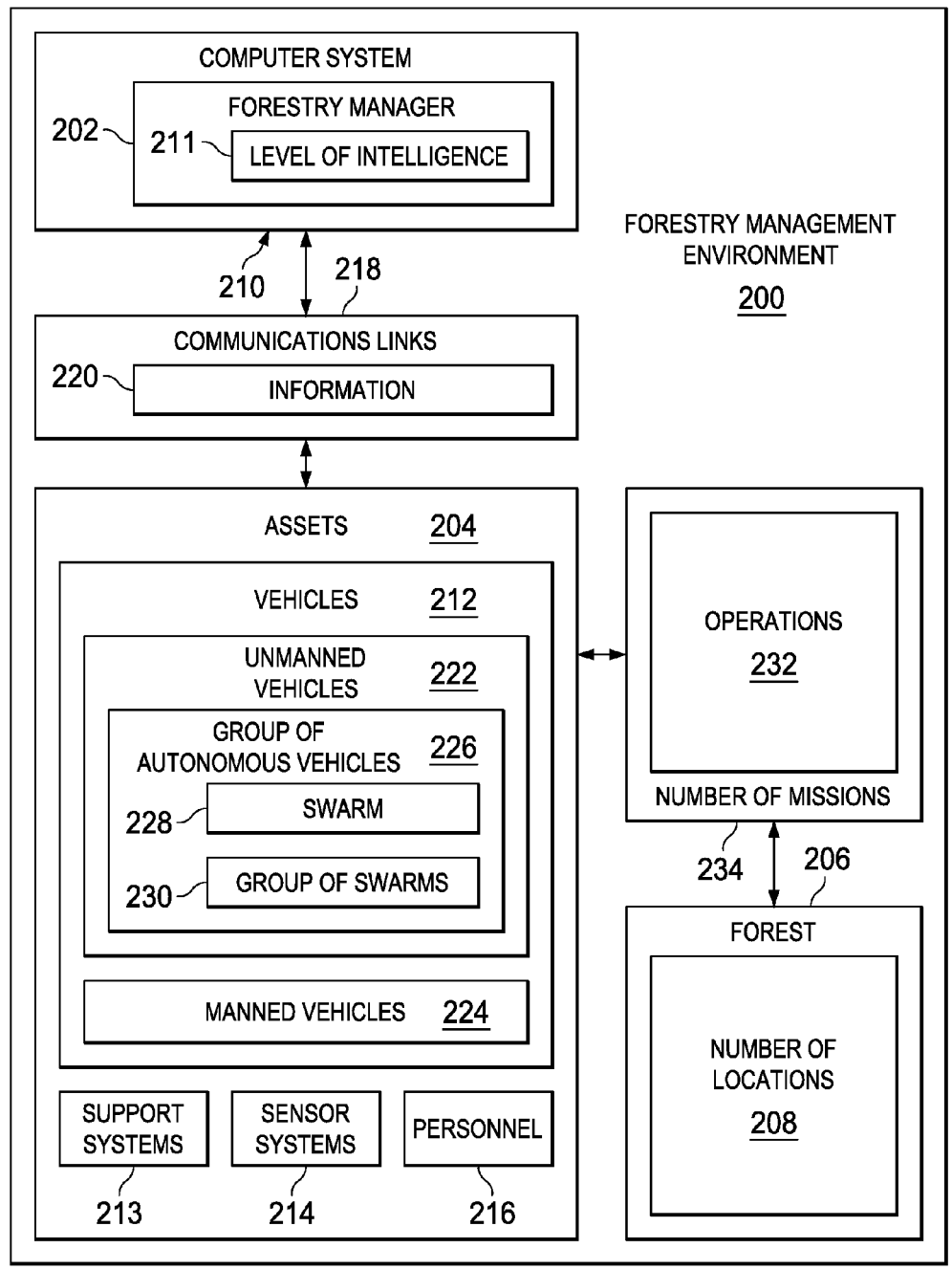
FIG. 2 is an illustration of a block diagram of a forestry management environment in accordance with an illustrative embodiment.

With reference now to FIG. 2, an illustration of a block diagram of a forestry management environment is depicted in accordance with an illustrative embodiment. Forestry management environment 100 in FIG. 1 is an example of one implementation for forestry management environment 200 in FIG. 2.

In this illustrative example, forestry management environment 200 includes forestry manager 202 and assets 204. Forestry manager 202 and assets 204 are configured to manage forest 206.

In particular, forestry manager 202 may be configured to manage number of locations 208 in forest 206. As used herein, a "number of" when used with reference to items means one or more items. For example, number of locations 208 is one or more locations. Number of locations 208 may be a portion of forest 206 or may include all of forest 206.

In this illustrative example, forestry manager 202 may be implemented using hardware, software, or a combination of the two. When software is used, the operations performed by forestry manager 202 may be implemented in program code configured to run on a processor unit. When hardware is employed, the hardware may include circuits that operate to perform the operations in forestry manager 202.

For example, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

As depicted, forestry manager 202 may be implemented within computer system 210. Computer system 210 is one or more computers. When more than one computer is present in computer system 210, those computers may be in communication with each other over a communications medium such as a network.

These computers may be in the same geographic location or separate geographic locations depending on the particular implementation. Further, in some illustrative examples, a portion or all of computer system 210 may be mobile. For example, one or more computers in computer system 210 may be located in or carried by a platform such as a truck, an aircraft, a ship, a human operator, or some other suitable platform.

In these illustrative examples, forestry manager 202 may have level of intelligence 211. Level of intelligence 211 may vary depending on the implementation of forestry manager 202. In some cases, forestry manager 202 may be a computer program that receives input from a human operator and provides output to a human operator.

In other illustrative examples, level of intelligence 211 may be higher such that input from a human operator may be unnecessary. For example, an artificial intelligence system and other suitable types of processors may provide a desired level of intelligence for level of intelligence 211 in forestry manager 202. In particular, the artificial intelligence system may include an expert system, a neural network, simple heuristics, fuzzy logic, Bayesian networks, or some other suitable type of system that provides a desired level of intelligence for level of intelligence 211 in forestry manager 202.

As depicted, assets 204 include at least one of vehicles 212, support systems 213, sensor systems 214, and personnel 216. In these illustrative examples, assets 204 may communicate with forestry manager 202 and with each other using communications links 218.

For example, assets 204 may generate information 220. Information 220 may be sent to forestry manager 202 over communications links 218. Additionally, information 220 may be exchanged between assets 204 over communications links 218. In these illustrative examples, information 220 may include, for example, information about at least one of vegetation, soil conditions, wildlife, air quality, pollution, temperature, rainfall, and other suitable types of information.

As depicted, vehicles 212 may include unmanned vehicles 222 and manned vehicles 224. Vehicles 212 may generate information 220 as vehicles 212 travel through or near number of locations 208 in forest 206. Unmanned vehicles 222 may be remotely controlled by personnel 216 or may be autonomous. Unmanned vehicles 222 may be selected from at least one of an unmanned aerial vehicle, an unmanned ground vehicle, an unmanned water vehicle, and other suitable types of unmanned vehicles. When unmanned vehicles 222 are unmanned water vehicles, the unmanned water vehicles may be used in a lake, a pond, a river, or some other suitable type of body of water near the forest. Manned vehicles 224 are vehicles that may carry personnel 216 and are operated by personnel 216.

Additionally, unmanned vehicles 222 may include group of autonomous vehicles 226. An autonomous vehicle is a vehicle that operates without intervention from a human operator. In these illustrative examples, an autonomous vehicle may be remotely controlled or may have a desired level of intelligence. As used herein, a "group" when used with reference to items means one or more items. For example, group of autonomous vehicles 226 is one or more autonomous vehicles. Group of autonomous vehicles 226 may be configured to operate as swarm 228 or group of swarms 230 in these illustrative examples.

Support systems 213 are hardware systems configured to provide support for vehicles 212. In particular, support systems 213 may provide support for unmanned vehicles 222. For example, support systems 213 may provide shelter, power, maintenance, and other types of support for unmanned vehicles 222.

Sensor systems 214 are also configured to generate information 220. In these illustrative examples, sensor systems 214 are in fixed locations in number of locations 208 or near number of locations 208 in forest 206.

Personnel 216 may perform operations including generation of information 220. For example, personnel 216 may carry sensors, operate manned vehicles 224, or operate unmanned vehicles 222 that are not within group of autonomous vehicles 226.

In this illustrative example, forestry manager 202 is configured to coordinate operations 232 performed by assets 204. Coordinating the operation of group of autonomous vehicles 226 to perform collection of information 220 may include collecting information 220 in at least one of a selected area in the forest, over a selected period of time, and with a selected level of detail.

Coordinating operations 232 also involves directing assets 204 to perform number of missions 234. Coordinating assets 204 to perform number of missions 234 may reduce redundancy or overlap in the operation of assets 204 when redundancy or overlap is undesirable.

Further, coordinating assets 204 to perform number of missions 234 may include directing assets 204 by, for example, without limitation, sending at least one of a command, a message, a mission, a task, data, and other information that directs and/or gives guidance in performing number of missions 234. This coordination may occur in a manner such that operations 232 are performed such that some or all of assets 204 may work together, as a single group, or in multiple groups to perform number of mission 234.

For example, forestry manager 202 may coordinate swarm 228 by sending commands to each of the autonomous vehicles in swarm 228. In these illustrative examples, swarm 228 is a plurality of autonomous vehicles, such as group of autonomous vehicles 226, which coordinate the performance of operations 232 with each other.

In yet other illustrative examples, forestry manager 202 may send tasks to each of the autonomous vehicles in swarm 228. Thus, group of autonomous vehicles 226 may use tasks and perform operations based on the tasks sent to each of the vehicles in group of autonomous vehicles 226.

In still another illustrative example, forestry manager 202 may send tasks to manned vehicles 224 in addition to swarm 228 of group of autonomous vehicles 226. When commands are sent to manned vehicles 224, these commands may be viewed by personnel 216 in manned vehicles 224 in these illustrative examples. Further, personnel 216 in manned vehicles 224 may use these commands as input to control manned vehicles 224. In other illustrative examples, personnel 216 may use these commands to perform operations on foot.

As depicted, forestry manager 202 may direct swarm 228 to a particular location in number of locations 208 and direct swarm 228 to generate information 220 in the particular location. In another example, forestry manager 202 may direct swarm 228 to travel along a selected path.

In a similar fashion, forestry manager 202 may send information for different missions in number of missions 234 to group of swarms 230. Thus, a swarm in group of swarms 230 may perform the same or different missions from other swarms in group of swarms 230.

With the use of forestry manager 202 and unmanned vehicles 222, the amount of personnel 216 may be reduced as compared to currently used systems. Further, when personnel 216 are limited, the use of unmanned vehicles 222 and, in particular, group of autonomous vehicles 226, may increase the ability to collect a desired amount of information 220 along with a desired accuracy and consistency for information 220 as compared to currently used systems for collecting information from number of locations 208 in forest 206.

Figure 3:
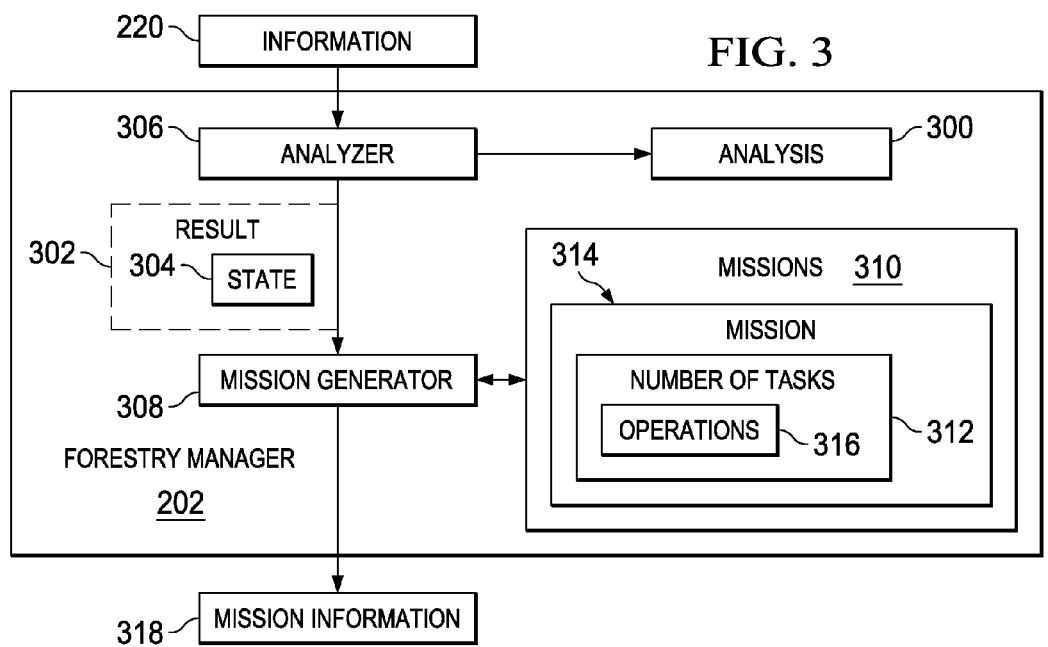
FIG. 3 is an illustration of data flow in a forestry manager in accordance with an illustrative embodiment.

Turning now to FIG. 3, an illustration of data flow in a forestry manager is depicted in accordance with an illustrative embodiment. In this depicted example, forestry manager 202 analyzes information 220 received from assets 204 in FIG. 2. In particular, forestry manager 202 performs analysis 300 using information 220.

In these illustrative examples, analyzer 306 performs analysis 300 to generate result 302. Result 302 includes state 304 for forest 206 in FIG. 2. State 304 may be, for example, without limitation, the state of forest health, forest inventory, safety risks, illegal activity, and other types of states of forest 206.

In these illustrative examples, analysis 300 of information 220 may be performed in a number of different ways to obtain result 302. Analysis 300 may include inspecting, cleaning, transforming, modeling, and other operations with respect to information 220.

As depicted, analysis 300 may be performed using any currently available analysis technique for data. For example, without limitation, analyzer 306 may perform analysis 300 of information 220 using image processing systems, light detection and ranging systems, geographic information systems, visual inspection systems, or other suitable types of systems. In particular, analyzer 306 may perform analysis 300 to obtain result 302 by using data clustering and correlation, anomaly detection, statistical and prognostic methods, and other suitable types of data analysis techniques. In some cases, analysis 300 also may include simulations using models of forest 206.

In other illustrative examples, result 302 may be obtained using a cloud detection system with trajectory generation methods and airborne laser scanners to provide timely and complete coverage of forest 206. Specifically, forestry manager 202 may perform analysis 300 on information 220 using this cloud detection system to obtain result 302 over a larger area of forest 206 than may be feasible with the use of currently available systems.

With result 302, mission generator 308 identifies missions 310. Additionally, mission generator 308 also may identify missions 310 without result 302. For example, prior to obtaining information 220 about forest 206, mission generator 308 may generate one or more of missions 310 to obtain information 220 for analysis 300 by analyzer 306. In this illustrative example, a mission is a goal or objective. In other words, a mission in missions 310 may be one or more goals or objectives.

For example, mission generator 308 identifies number of tasks 312 for mission 314 in missions 310. A task is a piece of work that is performed to achieve a mission. A task may be comprised of operations 316 that are performed for the piece of work.

Number of tasks 312 is one or more tasks to be performed by assets 204 in FIG. 2. Each task in number of tasks 312 may include one or more operations in operations 316. Mission generator 308 also may identify operations 316 for number of tasks 312 in generating mission 314.

For example, a mission may be to gather more information 220 about forest 206. The task in number of tasks 312 may be to monitor a particular location in number of locations 208 in forest 206. Operations 316 for the tasks may be to fly a selected path over the location in number of locations 208 in forest 206 and generate images of the location.

In these illustrative examples, mission generator 308 assigns at least one of mission 314, number of tasks 312, and operations 316 to assets 204. In other words, mission generator 308 may send different levels of mission information 318 to assets 204 depending on the intelligence of assets 204 that are to perform mission 314. This mission information 318 may be the same mission information 318 sent to each of assets 204. In other illustrative examples, mission information 318 may be different for each of the assets in assets 204. In this manner, forestry manager may coordinate the performance of missions 310 by sending mission information 318.

For example, mission generator 308 may generate mission 314 with number of tasks 312. Mission generator 308 assigns number of tasks 312 to group of autonomous vehicles 226 in FIG. 2. With the assignment of number of tasks 312, mission generator 308 sends mission information 318 to group of autonomous vehicles 226 to perform number of tasks 312 in mission 314.

In this manner, group of autonomous vehicles 226 may perform number of tasks 312 to complete all or a portion of mission 314. In some illustrative examples, mission generator 308 may assign a portion of number of tasks 312 to group of autonomous vehicles 226 and another portion of number of tasks 312 to manned vehicles 224 in FIG. 2. In this case, both group of autonomous vehicles 226 in unmanned vehicles 222 and manned vehicles 224 use mission information 318 to complete a portion of mission 314.

For example, when coordinating trespasser response, mission 314 may be to assist law enforcement. Mission generator 308 may send mission information 318 to unmanned aerial vehicle 108 to track an intruder, unmanned aerial vehicle 110 to take video footage of a crime scene, and manned vehicles 140 to bring personnel 138 in FIG. 1 to the location of the trespassing event. In this manner, each of assets 102 performs a portion of number of tasks 312 to complete mission 314 using mission information 318 sent by mission generator 308.

Mission information 318 may take various forms. For example, mission information 318 may include commands, tasks, data, and other suitable information. As an example, number of tasks 312 may be sent in mission information 318 to group of autonomous vehicles 226 such that group of autonomous vehicles 226 performs operations 316 necessary to achieve number of tasks 312 in mission 314. In other cases, mission information 318 may include commands needed to perform operations 316 to complete number of tasks 312 for missions 310.

In some cases, an identification of mission 314 in mission information 318 may be sufficient for assets 204 to perform mission 314. In other cases, number of tasks 312 may be assigned to assets 204.

For example, the assignment may involve assigning number of tasks 312 to one or more of group of autonomous vehicles 226. In other cases, number of tasks 312 may be assigned by sending number of tasks 312 to group of autonomous vehicles 226. Group of autonomous vehicles 226 may coordinate and make their own assignments after receiving number of tasks 312.

In other words, the assignment of number of tasks 312 may be to group of autonomous vehicles 226 as a whole, or to individual autonomous vehicles in group of autonomous vehicles 226. When the assignment of number of tasks 312 is to group of autonomous vehicles 226 as a whole, specific tasks in number of tasks 312 may be distributed to autonomous vehicles in group of autonomous vehicles 226 based on the location of the autonomous vehicles, the capability of the autonomous vehicles, the response time of the autonomous vehicles, or some other suitable parameters.

In another illustrative example, mission generator 308 may send an identification of operations 316 to be performed by different assets in assets 204. These different assets may be, for example, unmanned vehicles 222 and sensor systems 214. These operations 316 may be at various levels and may be as detailed as particular commands on direction of movement, when to collect information, and other operations.

Figure 4:
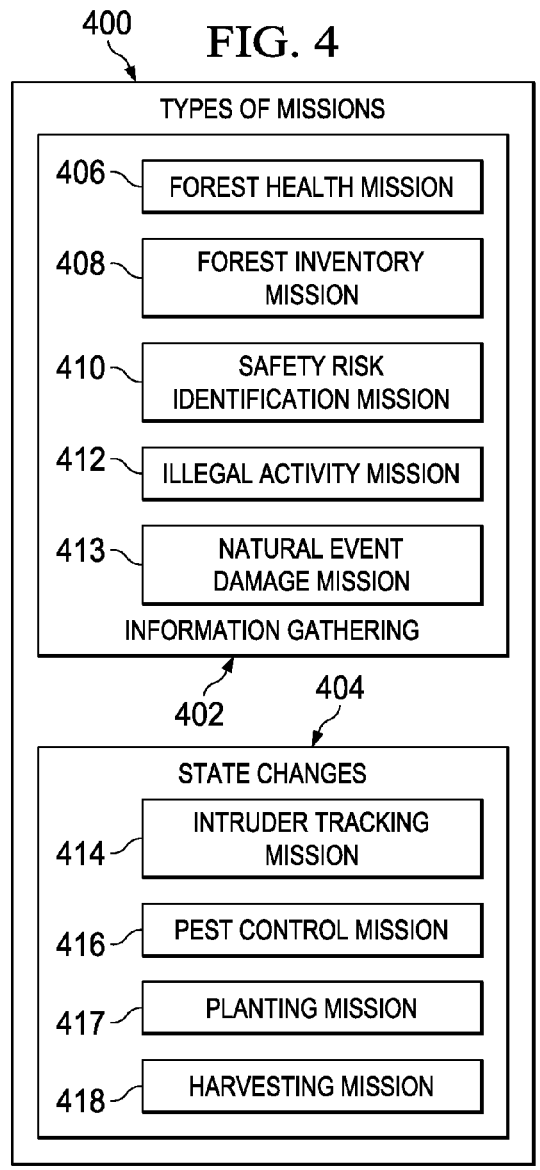
FIG. 4 is an illustration of a block diagram of types of missions in accordance with an illustrative embodiment.

Turning now to FIG. 4, an illustration of a block diagram of types of missions is depicted in accordance with an illustrative embodiment. In this depicted example, types of missions 400 are examples of missions 310 in FIG. 3.

Types of missions 400 may comprise at least one of information gathering 402 and state changes 404. Information gathering 402 comprises missions for obtaining information 220 in FIG. 2. State changes 404 comprise missions for causing a change in state 304 in FIG. 3 identified for forest 206 by forestry manager 202 in FIG. 2. In these illustrative examples, information gathering 402 may include at least one of forest health mission 406, forest inventory mission 408, safety risk identification mission 410, illegal activity mission 412, and natural event damage mission 413.

In this illustrative example, forest health mission 406 is configured to generate information 220 that may be used to identify the health of a location within forest 206. Forest health mission 406 may, for example, obtain information about trees in a location in forest 206. In particular, forest health mission 406 may identify a biodiversity of trees and other vegetation in forest 206.

Additionally, forest health mission 406 may be used to generate information 220 about spacing between trees. This forest health mission 406 may identify a presence of foreign species with respect to trees. In other words, types of species of trees that are not normally present in forest 206 may be identified using forest health mission 406. Additionally, pests, infection, and other information about trees in forest 206 may be identified through information 220 generated from forest health mission 406.

Forest health mission 406 may also collect information 220 that identifies the impact of human activity in forest 206. For example, forest health mission 406 may identify information about unmanaged recreation, hunting, and local agriculture activities in forest 206.

Further, forest health mission 406 also may generate information 220 used to identify the impact of natural events on forest 206. These natural events may include storms, fires, and other events that may occur naturally in forest 206.

Additionally, forest health mission 406 may generate information 220 about the health of vegetation on the floor of forest 206. With this type of mission, information about wildlife within forest 206 and the health of wildlife within forest 206 may be generated.

In these illustrative examples, forest inventory mission 408 may be used to generate information 220 used to classify land within forest 206. For example, forest inventory mission 408 may generate information used to identify a volume of wood that may be harvestable from forest 206. Additionally, carbon sequestration may be identified during forest inventory mission 408. In other words, the capture of carbon dioxide in forest 206 by trees and vegetation may be identified through forest inventory mission 408.

With safety risk identification mission 410, information 220 about safety risks such as a presence of fire may be included in this type of mission. In these illustrative examples, a "safety risk" is a risk of harm to forest 206 as a whole, wildlife or vegetation within forest 206, humans, or a combination thereof. Thus, safety risk identification mission 410 is used to generate information 220 about the safety risks within forest 206.

In some illustrative examples, safety risk identification mission 410 may generate information used to identify hazards to the public. This information may be used to identify what areas may be accessible by the public in forest 206. In this manner, safety risks may be decreased within forest 206. For example, when an area is determined to be a safety risk to the public by safety risk identification mission 410, forest manager 202 in FIG. 2 may send one of assets 204 to block off that area to the public.

Illegal activity mission 412 is used to generate information 220 that may be used to identify various illegal activities within forest 206. These illegal activities may include, for example, without limitation, poaching of timber, poaching of wildlife, illegal drug operations, trespassing in secured areas, squatting, and other illegal activities.

As depicted, natural event damage mission 413 may be used to generate information 220 about the damage that may be present after a natural event. For example, when a flood occurs in forest 206, information 220 about damage caused by the flood may be needed. In this case, forest manager 202 may send one of assets 204 to gather information 220 about state changes 404 resulting from the flood. Of course, forest manager 202 may send one of assets 204 to gather information 220 about other types of natural events such as, for example, without limitation, fire, wind, ice, snow, earthquake, tornado, or some other type of natural event.

In these illustrative examples, state changes 404 include missions that are used to change state 304 of forest 206. The change in state 304 may be for a portion or all of forest 206. As depicted, state changes 404 may include various types of missions 400. For example, state changes 404 may include at least one of intruder tracking mission 414, pest control mission 416, planting mission 417, harvesting mission 418, and other suitable types of missions 400.

In these illustrative examples, intruder tracking mission 414 is a mission in which assets 204 are coordinated to identify and track an intruder within forest 206. Pest control mission 416 may be used to control pests that may affect the health of forest 206 in an undesired manner. Pest control mission 416 may be used to send assets 204 to forest 206 to perform operations 316 to control or eliminate pests that may be in forest 206.

For example, assets 204 may distribute chemicals, electrical agents, and other components to control pests that may be present in forest 206. These pests may be vegetation, wildlife, or other types of pests.

In this illustrative example, planting mission 417 may be performed to plant trees in forest 206. In these illustrative examples, planting mission 417 may include planting seedlings of trees in number of locations 208 of forest 206. Number of locations 208 may be one or more locations in which open areas are present in forest 206 or in which trees are present, but the density of the trees is not as great as desired.

Harvesting mission 418 may be performed to harvest trees in forest 206. Assets 204 may be assets configured to harvest trees that have been identified in particular locations in forest 206. For example, tree harvesters in vehicles 212 in FIG. 2 may be used to harvest trees in forest 206. These tree harvesters may take the form of autonomous vehicles within group of autonomous vehicles 226.

The illustration of types of missions 400 in FIG. 4 is only presented as an example of some types of missions that may be present in missions 310. The examples of types of missions 400 are not meant to imply limitations to other types of missions that may be used. Further, in some cases, only some of the missions illustrated in types of missions 400 may be used rather than all of the types of missions in types of missions 400. The tasks and the operations performed for each of types of missions 400 may vary and may be implemented in numerous different ways depending on the makeup of forest 206 and the particular situation.

Figure 5:
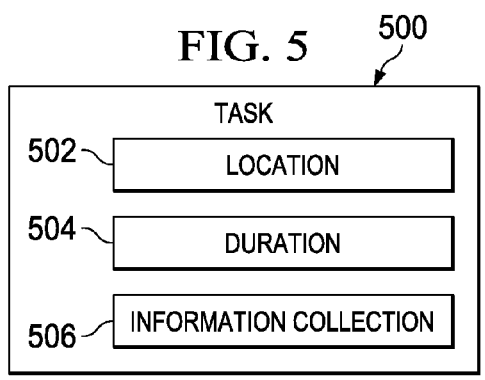
FIG. 5 is an illustration of a block diagram of a task in accordance with an illustrative embodiment.

With reference now to FIG. 5, an illustration of a block diagram of a task is depicted in accordance with an illustrative embodiment. In this depicted example, task 500 is an example of a task that may be used to implement one or more of number of tasks 312 in FIG. 3.

As depicted, task 500 may have a number of different components. In this illustrative example, task 500 includes location 502, duration 504, and information collection 506.

Location 502 is a location in which task 500 is to be performed. Location 502 may be defined as a geographic area, a physical volume, or a path. For example, location 502 may define an area on the ground in which the task is to be performed. In other illustrative examples, location 502 also may define a height in which information 220 in FIG. 2 is to be collected. In other illustrative examples, location 502 may be defined as a path that is to be travelled by the asset for the task.

Duration 504 identifies a period of time during which the task is to be performed. Duration 504 may include a start time and an end time.

In some illustrative examples, duration 504 may be defined based on an amount of power remaining in the asset for performing the task. In some cases, duration 504 may be defined as an amount of information 220 collected, a type of information 220 collected, or based on some other parameter other than time. Of course, a combination of these different types of measurements for duration 504 also may be used.

Information collection 506 identifies the type of information 220 to be collected and may also identify the manner in which information 220 is to be collected. In this case, information 220 may include information such as images, temperature readings, humidity readings, sample collections, and other suitable types of information. Further, information collection 506 also may define a frequency at which information 220 is to be collected.

Further, information collection 506 also may define the granularity of information 220 to be collected. For example, information collection 506 may define a higher granularity such that information 220 generates images of the height, straightness, taper, and volume of trees. In other illustrative examples, a lower granularity may merely comprise generating images of the location rather than more detailed measurements of trees in the location. Of course, any granularity may be defined in information collection 506 for task 500.

Figure 6:
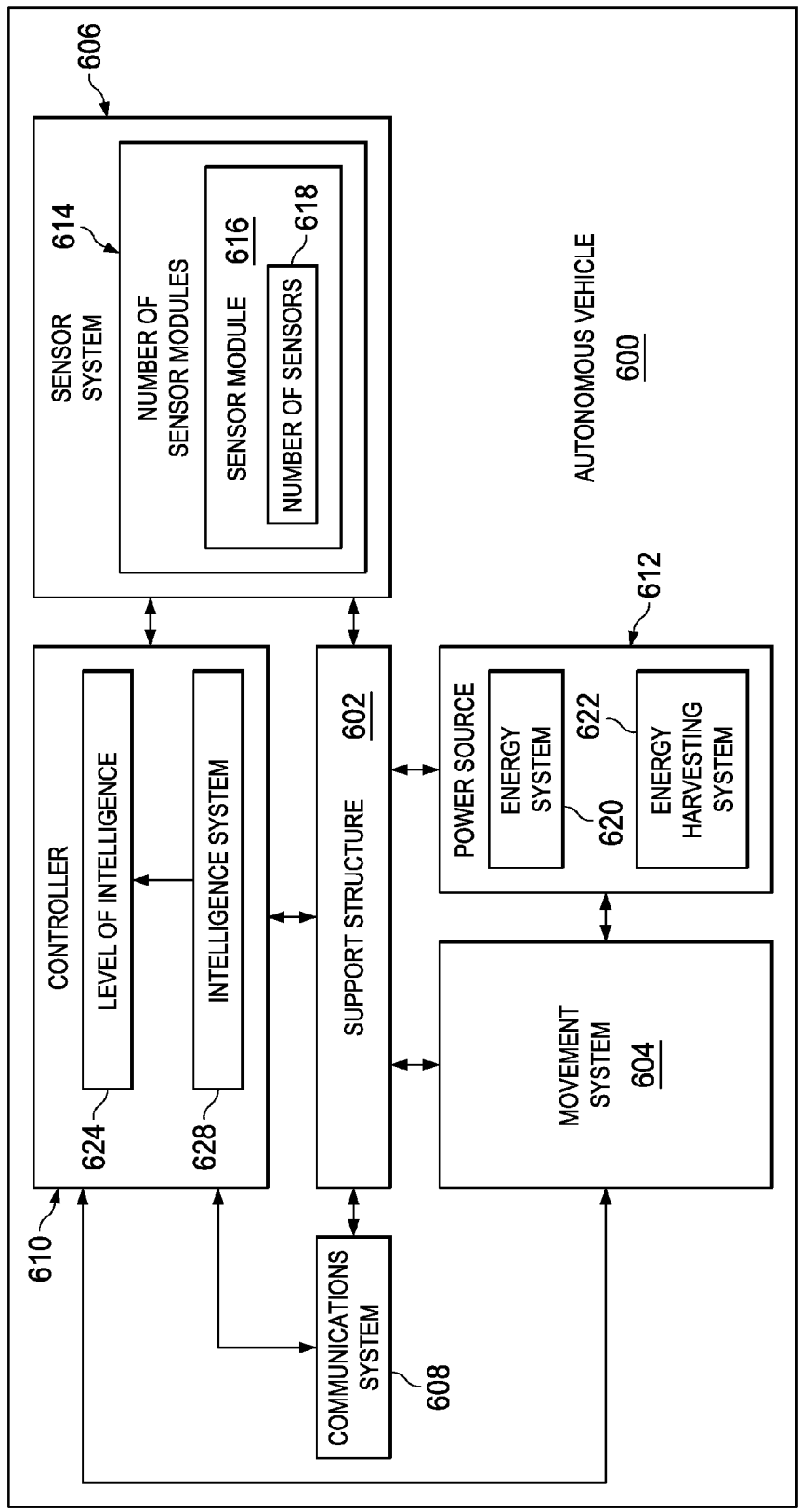
FIG. 6 is an illustration of a block diagram of an autonomous vehicle in accordance with an illustrative embodiment.

Turning now to FIG. 6, an illustration of a block diagram of an autonomous vehicle is depicted in accordance with an illustrative embodiment. In this depicted example, autonomous vehicle 600 is an example of one implementation for an autonomous vehicle within group of autonomous vehicles 226 in FIG. 2. Unmanned aerial vehicle 108, unmanned aerial vehicle 110, unmanned aerial vehicle 112, unmanned ground vehicle 116, and unmanned ground vehicle 118 are physical examples of unmanned vehicles that may be implemented as autonomous vehicles using components in autonomous vehicle 600.

In this illustrative example, autonomous vehicle 600 includes a number of different components. For example, autonomous vehicle 600 includes support structure 602, movement system 604, sensor system 606, communications system 608, controller 610, and power source 612.

Support structure 602 provides a structure for physical support of the other components in autonomous vehicle 600. Support structure 602 may be, for example, at least one of a frame, a housing, a body, and other suitable types of structures.

Movement system 604 is associated with support structure 602 and is configured to provide movement for autonomous vehicle 600. Movement system 604 may take various forms. For example, movement system 604 may include at least one of legs, wheels, tracks, and other suitable types of mechanisms for moving autonomous vehicle 600.

Sensor system 606 is a system associated with support structure 602. Sensor system 606 is configured to generate information about the environment around autonomous vehicle 600. Sensor system 606 may include many types of sensors.

In these illustrative examples, sensor system 606 may include number of sensor modules 614. In these illustrative examples, a sensor module in number of sensor modules 614 is removable. In other words, one sensor module may be swapped out for another sensor module in number of sensor modules 614 in sensor system 606 in autonomous vehicle 600.

In this manner, creator versatility may be provided for autonomous vehicle 600. In particular, a sensor module in number of sensor modules 614 may be selected for use by autonomous vehicle 600 depending on the mission or task assigned to autonomous vehicle 600. Further, with the use of number of sensor modules 614, the weight of autonomous vehicle 600 may be reduced by reducing the number of sensors in sensor system 606 only to those needed for a particular mission or task.

For example, sensor module 616 may be comprised of number of sensors 618. The composition of number of sensors 618 may be selected for the particular type of mission or task to be performed.

Communications system 608 is associated with support structure 602. As depicted, communications system 608 is configured to provide communications between autonomous vehicle 600 and another device. This other device may be, for example, one of other assets in assets 204, computer system 210, forestry manager 202, and other suitable components. The communications may be wireless communications in these illustrative examples. In some cases, a wired communications interface may also be present.

Power source 612 is associated with support structure 602. Power source 612 is configured to provide power for the other components in autonomous vehicle 600. Power source 612 may take a number of different forms. For example, power source 612 may include at least one of energy system 620 and energy harvesting system 622.

In this illustrative example, energy system 620 may include one or more batteries. These batteries may also be modular and replaceable. In other illustrative examples, energy system 620 may be a fuel cell or some other suitable type of energy system.

Energy harvesting system 622 is configured to generate power for components in autonomous vehicle 600 from the environment around autonomous vehicle 600. For example, energy harvesting system 622 may include at least one of a biomechanical harvesting system, a piezoelectric harvesting system, a thermoelectric harvesting system, a tree-metabolic harvesting system, solar cells, a micro wind turbine generator, an ambient radio wave receiver, and other suitable types of energy harvesting systems that generate power from the environment around autonomous vehicle 600.

In this illustrative example, controller 610 is associated with support structure 602. As depicted, controller 610 takes the form of hardware and may include software.

Controller 610 is configured to control the operation of autonomous vehicle 600. Controller 610 may provide level of intelligence 624. Level of intelligence 624 may vary depending on the particular implementation of autonomous vehicle 600. Level of intelligence 624 may be one example of level of intelligence 211 in FIG. 2.

In some cases, level of intelligence 624 may be such that controller 610 receives specific commands. These commands may include, for example, a direction of travel, a waypoint, when to generate information 220 using sensor system 606, and other similar commands.

In other illustrative examples, level of intelligence 624 may be higher such that autonomous vehicle 600 may receive a task. Controller 610 may identify operations for performing the task. This task may be a fixed task in which autonomous vehicle 600 follows a path in a particular area to generate information 220 using sensor system 606.

In other illustrative examples, level of intelligence 624 may be even higher such that autonomous vehicle 600 is configured to communicate with other autonomous vehicles to coordinate performing one or more tasks. For example, controller 610 may include a circuit, a computer program, an artificial intelligence system, and other suitable types of processes that may provide a desired level for level of intelligence 624.

In these illustrative examples, intelligence system 628 may provide level of intelligence 624. Intelligence system 628 may use an expert system, a neural network, fuzzy logic, or some other suitable type of system to provide level of intelligence 624.

Level of intelligence 624 in controller 610 may allow for functions such as dynamic path planning. In this manner, obstacles may be identified along a path and may therefore be avoided. This identification and avoidance of obstacles may be performed in real time. These obstacles may include, for example, without limitation, a branch, a tree trunk, and other obstacles in forest 206.

Controller 610 also may monitor health of different systems in autonomous vehicle 600. For example, controller 610 may monitor a level of energy being provided or remaining in power source 612. If power source 612 only includes batteries in energy system 620, controller 610 may direct autonomous vehicle 600 to return to base for the recharging or exchange of batteries.

The illustration of autonomous vehicle 600 in FIG. 6 is not meant to imply limitations to the manner in which autonomous vehicle 600 may be implemented. In other illustrative examples, autonomous vehicle 600 may include other components in addition to or in place of the ones depicted. For example, autonomous vehicle 600 also may include systems for performing state changes. These systems may include, for example, without limitation, a tree logging system, a chemical dispersant system, a water distribution system, and other suitable types of systems.

In yet other illustrative examples, sensor system 606 may include a laser scanner used below the surface of a tree canopy to determine tree size. As another example, sensor system 606 may consist of soil moisture and nutrient monitoring probes that may be deployed to identify optimal timing and methods for planting. For example, these nutrient monitoring probes may be used to sample soil at various depths to determine the quantity of carbon or other elements within the soil of forest 206. In still other illustrative examples, sensor system 606 may be used to sample water run-off, streams, and other bodies of water, such as body of water 129 in FIG. 1, to determine state changes 404 of these bodies of water within forest 206.

Turning now to FIG. 7, an illustration of a block diagram of a positioning and map building sensor module is depicted in accordance with an illustrative embodiment. As depicted, sensor module 700 is an example of one implementation of sensor module 616 in sensor system 606 in FIG. 6.

Sensor module 700 takes the form of positioning and mapping sensor module 702. Positioning and mapping sensor module 702 may be removable or fixed within sensor system 606 depending on the particular implementation.

As depicted, sensor module 700 includes global positioning system receiver 704, inertial measurement unit 706, altimeter 708, wheel encoder 710, laser range finder 712, and camera system 714.

Global positioning system receiver 704 may be used to identify a location of the global positioning system receiver in autonomous vehicle 600 in three-dimensional coordinates. These coordinates may include latitude, longitude, and altitude. Global positioning system receiver 704 uses a satellite system to provide these three-dimensional coordinates.

Inertial measurement unit 706 may also be used to identify the three-dimensional coordinates of autonomous vehicle 600. Inertial measurement unit 706 may supplement or provide refinement of positions generated by global positioning system receiver 704.

As depicted, altimeter 708 may identify an altitude of autonomous vehicle 600 when global positioning system receiver 704 does not provide a desired level of accuracy. In these examples, wheel encoder 710 may provide an odometer reading. Specifically, wheel encoder 710 may estimate distance traveled by counting the number of rotations of the wheel.

In the illustrative examples, laser range finder 712 is configured to identify distances to different objects around autonomous vehicle 600. Laser range finder 712 may generate three-dimensional coordinates for features around autonomous vehicle 600. In particular, laser range finder 712 may generate data for a point cloud. This point cloud may be used to generate a three-dimensional map of one or more locations in forest 206.

Camera system 714 is configured to generate images. These images may be correlated with data for the point cloud. In these illustrative examples, camera system 714 may include one or more cameras. For example, camera system 714 may include a visible light camera, a stereographic camera, an infrared camera, and other suitable types of cameras.

The illustration of sensor module 700 is not meant to imply limitations to the manner in which other sensor modules in sensor system 606 may be implemented for generating positioning and mapping information. For example, other sensor modules may exclude wheel encoder 710 and altimeter 708. In still other illustrative examples, camera system 714 may be unnecessary.

In yet other illustrative examples, sensor module 700 may include a processor unit to pre-process information generated for mapping a location. Further, wheel encoder 710 may be used with ground-based vehicles and may be unnecessary with the aircraft or other vehicles.

Turning now to FIG. 8, an illustration of a block diagram of a sensor module is depicted in accordance with an illustrative embodiment. In this depicted example, sensor module 800 is another example of an implementation for sensor module 616 in sensor system 606 in FIG. 6. As depicted, sensor module 800 takes the form of forest inventory sensor module 802.

In this illustrative example, forest inventory sensor module 802 includes a number of different components. For example, forest inventory sensor module 802 includes global positioning system receiver 804, camera system 806, laser range finder 808, and identifier 810.

Global positioning system receiver 804 is configured to identify a location of sensor module 800 and, in particular, the location of autonomous vehicle 600. Camera system 806 is configured to generate images of the environment around autonomous vehicle 600. In particular, these images may be images of trees and other vegetation.

Laser range finder 808 is configured to identify distances to various objects such as trees or other vegetation. Laser range finder 808 is configured to generate information about the location of these trees with respect to autonomous vehicle 600.

Identifier 810 is configured to classify trees and plants in forest 206. Identifier 810 may take the form of hardware and may include software. In these illustrative examples, identifier 810 may obtain images from camera system 806 and identify trees and vegetation based on the recognition of leaves, flowers, and other features that may be identified in the images.

Thus, the location of a particular tree or piece of vegetation may be identified knowing the location of autonomous vehicle 600 using information from global positioning system receiver 804. In this manner, identifier 810 may perform some processing of position information to generate information about species of trees and other vegetation and the location of these species in forest 206.

Although these illustrative examples depict forest inventory sensor module 802 with global positioning system receiver 804, camera system 806, laser range finder 808, and identifier 810, other components or sensors may be used in addition to or in place of the components illustrated in this figure. For example, sensors in forest inventory sensor module 802 may include hyperspectral imaging sensors, gas sensors, water quality sensors, airborne and terrestrial laser scanners, decay detectors, ground-penetrating radar, or other suitable types of sensors depending on the particular implementation.

With reference now to FIG. 9, an illustration of a block diagram of a support system is depicted in accordance with an illustrative embodiment. In this illustrative example, support system 900 is an example of components that may be used in a support system in support systems 213 in FIG. 2.

As depicted, support system 900 has a number of different components. Support system 900 includes platform 902, covered area 904, communications unit 906, energy replenishment system 907, sensor modules 912, and operator interface 914.

In this illustrative example, platform 902 is a structure on which autonomous vehicle 600 in FIG. 6 may land or move onto depending on the particular implementation. Platform 902 may be a mobile platform, a stationary platform, or some other suitable type of platform in these illustrative examples.

Covered area 904 may be an area in which autonomous vehicle 600 may be sheltered from the environment. Communications unit 906 may provide communications with autonomous vehicle 600, forestry manager 202, or some other suitable component.

Energy replenishment system 907 may include charging system 908, batteries 910, and other suitable components. Energy replenishment system 907 may be configured to recharge or otherwise provide energy system 620 in FIG. 6 with power.

Charging system 908 is configured to recharge energy system 620 in autonomous vehicle 600 in FIG. 6. Batteries 910 may be used to replace batteries in energy system 620 when batteries are used in energy system 620, instead of recharging batteries depending on the condition of the batteries. Additionally, sensor modules 912 are examples of modules that may be replaceable in number of sensor modules 614 in FIG. 6.

Operator interface 914 may be a display system with a touch screen in these illustrative examples. Operator interface 914 may be viewed by personnel 138 in FIG. 1 to receive commands, missions, or other information about forest 206.

Operator interface 914 may also be used to input visual inspection results or other information that may be used by analyzer 306 to perform analysis 300 in FIG. 3.

The illustration of components in support system 900 in FIG. 9 is only shown as an example and is not meant to limit the manner in which other support systems may be implemented. For example, other support systems may omit communications unit 906. In still other illustrative examples, a support system may include a storage device configured to store information generated by autonomous vehicle 600 or other platforms.

The illustration of forestry management environment 200 in FIG. 2 and the different components in FIGS. 2-9 are not meant to imply physical or architectural limitations to the manner in which forestry management environment 200 and the different components may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Further, the different components shown in FIG. 1 may be combined with components in FIGS. 2-9, used with components in FIG. 2-9, or a combination of the two. Additionally, some of the components in FIG. 1 may be illustrative examples of how components shown in block form in FIGS. 2-9 can be implemented as physical structures.

For example, in some illustrative examples, manned vehicles 224 may be omitted from forestry management environment 200 in generating information 220 in FIG. 2. In still other illustrative examples, personnel 216 also may be unnecessary for generating information 220. In yet other illustrative examples, support systems 213 may be omitted. In still other illustrative examples, forestry manager 202 may be located on one of vehicles 212 in these illustrative examples.

Moreover, although specific groupings of sensors are illustrated in support system 900 in FIG. 9 and sensor module 800 in FIG. 8, those sensors may be included in sensor system 606 without taking the form of a removable sensor module. In other words, sensor module 800 and support system 900 may be fixed in sensor system 606.

The illustrative embodiments also recognize and take into account that collecting information from a forest using a forestry manager also may include collecting information for use in managing trees in a forest. For example, the information may be used to inform the process for planting and harvesting trees. For example, the information may be used to plant trees in the forest. In particular, the information may be used to plant seedlings in the forest.

Additionally, the information also may be used to in-fill portions of recently planted areas to establish a uniform coverage of healthy new-growth trees. In particular, the illustrative embodiments recognize and take into account that this information may be collected as part of forest inventory mission 408 in FIG. 4. In these illustrative examples, "in-fill" with respect to planting trees is the process of planting additional trees in an area that does not currently have the desired number, size, growth rate, health, or density of trees.

The illustrative embodiments recognize and take into account that the current methodologies for collecting information to plant trees may not be as accurate as desired. The illustrative embodiments also recognize and take into account that current methodologies for planting trees involve analyzing a history of weather conditions for a location in the forest. The history may be used along with forecasted weather conditions to plant trees in the forest. For example, this information may be used to determine when and where trees may be planted.

The illustrative embodiments recognize and take into account that the currently used methodologies for collecting information to plant trees do not provide as accurate of information as desired. Accurate information is needed for foresters to plant seedlings such that the seedlings grow as desired. When the soil is too cold for planting, seedlings may die or may not grow as desired. Further, drought conditions may also make planting seedlings more difficult than desired to obtain desired growth of the seedlings.

Without accurate information, foresters that would like to plant as early in the season as desired may risk the seedlings freezing or dying. As a result, foresters may utilize a more expensive planting strategy to minimize seedling mortality rates given uncertainties in soil conditions and weather conditions. For example, a forester may choose to plant more seedlings than required to account for future losses. However, planting a larger amount of seedlings may result in higher planting costs.

In other cases, a forester may choose to plant larger seedlings as measured by the root collar diameter, or choose to plant containerized seedlings. Both larger seedling stock and containerized seedling stock are more expensive to procure, and may not provide a desired increase in seedling health given favorable soil conditions and weather conditions. In other words, with favorable soil conditions and weather conditions, a less expensive bare root seedling may be as effective as a more expensive containerized seedling. Thus, knowing soil conditions and weather conditions prior to planting trees may allow foresters to more effectively plan planting processes than can be done with currently used methodologies.

The illustrative embodiments recognize and take into account that the information collected using an illustrative embodiment may be used to more accurately determine what types of seedlings and how many seedlings should be planted in addition to when and where seedlings should be planted. As a result, one or more illustrative embodiments may reduce the cost for planting trees.

The illustrative embodiments also recognize and take into account that collecting information needed to determine when forest operations should be performed may be more difficult than desired. These forest operations may include harvesting, inspecting, core sampling, controlling weeds, measuring, thinning, and other suitable types of operations. For example, the information for making harvesting decisions is currently collected by operators walking through the forest and taking measurements. These measurements include the height and diameter of trees. Height and diameter measurements may be used to determine whether an area of the forest is ready for harvesting. For example, when the diameter of trees in an area of the forest reaches a desired threshold value, trees in that area of the forest may be ready to harvest.

In other examples, soil data may be measured and used to determine whether the soil conditions are desired soil conditions for logging operations. As an illustrative example, personnel managing a forest may want to know soil conditions prior to performing harvesting operations to minimize erosion from the use of harvesting equipment. In this case, if the soil is wetter than desired, erosion of the top layer of soil may be increased with the use of harvesting equipment. This erosion of the top layer of soil may impact growth of reforested trees in these illustrative examples.

Further, wetter than desired soil may make it more difficult to operate harvesting equipment. As an example, harvesting equipment may get stuck in wet soil.

In other illustrative examples, drier than desired soil may cause an undesired amount of dust to be blown into the air during harvesting operations. This dust may also impact the top soil layer. In still other illustrative examples, soil conditions may aid in monitoring the risk of certain type of pests, depending on the particular implementation. Although some of these conditions may be estimated using weather forecasts and weather data, these sources of information may not identify the current condition of the soil conditions as accurately as desired.

Currently, trained operators may traverse areas that are difficult to access, hazardous to access, difficult to navigate, or some combination thereof. Many regulatory requirements also require at least two operators to minimize risks in collecting soil data. As a result, travel to and from different areas of a forest may result in a substantial labor cost. Further, the travel also may be costly with regard to equipment. The terrain may result in increased maintenance costs of the equipment that may be greater than desired.

The illustrative embodiments also recognize and take into account that when operators are obtaining soil samples, more than one sample may be needed in a particular area to account for elevation changes, land features, or other factors that may affect the density, moisture, chemical content, and other parameters of the soil in the locations. Thus, the cost for obtaining desired information about the soil in an area in which forest operations are planned may be greater than desired.

Further, if the area is not ready for forest operations, the collection of data is repeated again at a later time. As a result, the cost of obtaining information for forest operations may be greater and more difficult than desired.

Thus, the illustrative embodiments provide a method and apparatus for planting trees, monitoring trees, harvesting trees, or a combination thereof. In these illustrative examples, the information collected relates to a number of soil conditions in the forest.

In one illustrative embodiment, a forestry manager is configured to receive information relating to a number of soil conditions for a location in a forest from a sensor system deployed by a group of aerial vehicles. The forestry manager is also configured to identify a mission based on the number of soil conditions.

Figure 10:
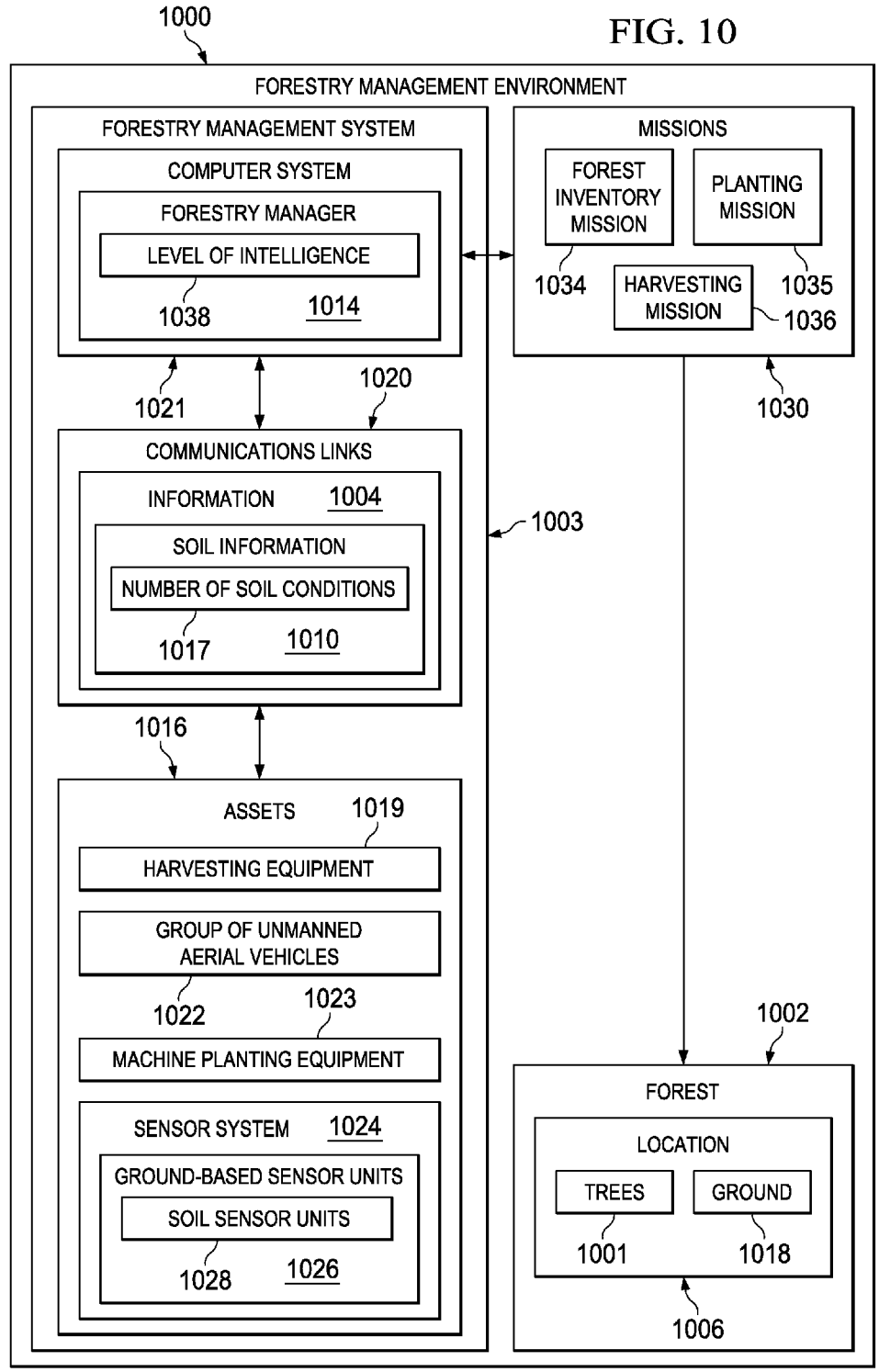
FIG. 10 is an illustration of a block diagram of a forestry management environment in accordance with an illustrative embodiment.

With reference now to FIG. 10, an illustration of a block diagram of a forestry management environment is depicted in accordance with an illustrative embodiment. In this illustrative example, forestry management environment 1000 is an environment in which planting, harvesting, or planting and harvesting of trees 1001 in forest 1002 may occur.

In this example, forestry management environment 1000 includes forestry management system 1003. The components shown in forestry management system 1003 may be part of a forest sensor deployment and monitoring system in these illustrative examples.

As depicted, forestry management system 1003 in forestry management environment 1000 is configured to generate and analyze information 1004 about location 1006 in forest 1002. In particular, information 1004 about location 1006 in forest 1002 takes the form of soil information 1010. Information 1004 may be used to determine whether location 1006 in forest 1002 has favorable conditions for planting of trees 1001. Additionally, information 1004 also may be used to determine whether trees 1001 in location 1006 in forest 1002 are ready for harvesting.

In these illustrative examples, forestry management system 1003 comprises forestry manager 1014 and assets 1016. Assets 1016 are configured to generate information 1004 about location 1006 in forest 1002. In these illustrative examples, soil information 1010 in information 1004 includes number of soil conditions 1017.

In these illustrative examples, soil information 1010 about number of soil conditions 1017 may include moisture, a temperature, conductivity, nitrogen content, pH, calcium content, salt content, and a nutrient content, and other suitable soil conditions. Number of soil conditions 1017 may be used to determine when and where to plant trees 1001 in location 1006. Number of soil conditions 1017 also may be used to determine what tree species, seedling type, or both tree species and seedling type for trees 1001 should be planted. For example, information about number of soil conditions 1017 in location 1006 may inform foresters that a certain species of tree may grow better in location 1006.

In this example, a particular nutrient content or pH may be more favorable to a certain species of trees 1001. In other illustrative examples, information about moisture in location 1006 may be used to select the type of seedling for trees 1001 that provides the desired density, growth, health, or other parameters for planting trees 1001 in location 1006.

Further, number of soil conditions 1017 also may be used to determine whether forest operations may be performed on trees 1001. In particular, number of soil conditions 1017 also may be used to determine whether ground 1018 in location 1006 is in a condition that is suitable for operating harvesting equipment. For example, harvesting equipment 1019 may include trucks, tree loggers, and other types of equipment. Number of soil conditions 1017 may be used to determine whether ground 1018 in location 1006 is stable enough to move harvesting equipment 1019 into location 1006 and perform harvesting of trees 1001 in location 1006 in forest 1002.

Additionally, number of soil conditions 1017 may also provide information as to how planting of seedlings should occur. For example, number of soil conditions 1017 may be used to determine whether machine planting or hand planting of seedlings for trees 1001 is preferable.

Machine planting is a method of mechanically planting trees 1001 in location 1006 in forest 1002 using machine planting equipment 1023. Depending on number of soil conditions 1017, machine planting may increase the seedling survival rate. For example, when the soil in ground 1018 is hard and dry, a machine planter may break up the soil which may promote better root growth for seedlings.

Of course, the selection of the type of planting method may also depend on the availability of machine planting equipment 1023 and other suitable factors that may produce the highest survival rate of the seedlings for trees 1001 while lowering the cost of planting trees 1001 as compared to currently used methodologies. In other illustrative examples, if number of soil conditions 1017 are too wet for certain types of machine planting equipment, manual planting methods or other planting methods may be used, depending on the particular implementation.

In these illustrative examples, forestry manager 1014 is configured to receive information 1004 from assets 1016 over communications links 1020. In these illustrative examples, communications links 1020 take the form of wireless communications links.

As depicted, forestry manager 1014 may be implemented using hardware, software, or some combination thereof. In particular, forestry manager 1014 may be implemented in computer system 1021.

Assets 1016 include a group of aerial vehicles such as group of unmanned aerial vehicles 1022. Assets 1016 also include sensor system 1024, and harvesting equipment 1019. In some illustrative examples, the group of aerial vehicles may be manned aerial vehicles.

Sensor system 1024 takes the form of ground-based sensor units 1026. Ground-based sensor units 1026 may take the form of soil sensor units 1028.

In this illustrative example, information 1004 may be generated by at least one of group of unmanned aerial vehicles 1022 and ground-based sensor units 1026 in sensor system 1024. In this example, a ground-based sensor unit in number of ground-based sensor units 1026 is configured to generate information 1004 about at least one of location 1006 of the ground-based sensor unit, a trajectory of the ground-based sensor unit, and an orientation of the ground-based sensor unit. In this manner, ground-based sensor units 1026 provide information 1004 about ground-based sensor units 1026 and the environment around ground-based sensor units 1026.

As depicted, ground-based sensor units 1026 may be deployed by group of unmanned aerial vehicles 1022. In other words, group of unmanned aerial vehicles 1022 may drop ground-based sensor units 1026 such that ground-based sensor units 1026 land in location 1006 in forest 1002. In particular, ground-based sensor units 1026 may be deployed to land on ground 1018 in forest 1002.

In these illustrative examples, forestry manager 1014 is configured to analyze information 1004 about location 1006 in forest 1002 to determine where and how trees 1001 should be planted in location 1006. Further, information 1004 also may be used to determine what types of trees 1001 should be planted. For example, information 1004 may be used to determine whether bare root seedlings or containerized seedlings should be planted in location 1006. Additionally, information 1004 also may be used to determine different sizes of seedlings that may be used. The selection of the types and sizes of seedlings may be made to reduce the cost of planting trees 1001, to increase the likelihood that the seedlings will survive, or some combination thereof.

Forestry manager 1014 also is configured to analyze information 1004 about location 1006 in forest 1002 to determine whether trees 1001 in location 1006 in forest 1002 are ready for harvesting. In particular, number of soil conditions 1017 may be used to determine whether ground 1018 is suitable for harvesting equipment 1019 to traverse location 1006.

In these illustrative examples, forestry manager 1014 may identify at least one mission in missions 1030. In these illustrative examples, the identification of the mission may be an identification of a mission to be performed without generating a number of tasks to perform the mission. In other illustrative examples, the identification of the mission may include generating the number of tasks for the mission. The identification of the mission also may include identifying and assigning assets 1016 to perform particular tasks in the mission.

In these illustrative examples, missions 1030 may include at least one of forest inventory mission 1034, planting mission 1035, harvesting mission 1036, and other suitable types of missions. As depicted, forest inventory mission 1034 is configured to generate information 1004 which includes soil information 1010 in these illustrative examples. Planting mission 1035 is configured to plant trees 1001 in forest 1002. Harvesting mission 1036 is configured to harvest trees 1001 in forest 1002. In these illustrative examples, forestry manager 1014 may have level of intelligence 1038 that is configured to control the operation of assets 1016 without requiring input from a human operator.

Figure 11:
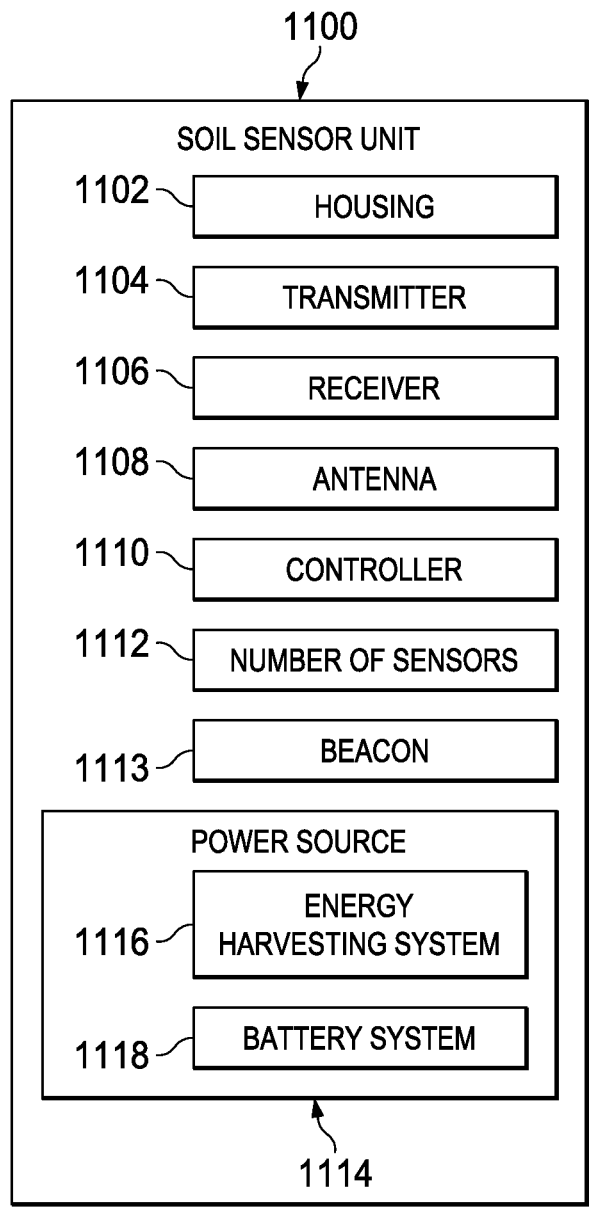
FIG. 11 is an illustration of a block diagram of ground-based sensor unit in accordance with an illustrative embodiment.

Turning now to FIG. 11, an illustration of a block diagram of a ground-based sensor unit is depicted in accordance with an illustrative embodiment. In this depicted example, soil sensor unit 1100 is an example of a soil sensor in soil sensor units 1028 for ground-based sensor units 1026 in FIG. 10.

As depicted, soil sensor unit 1100 includes a number of different components. In this illustrative example, soil sensor unit 1100 comprises housing 1102, transmitter 1104, receiver 1106, antenna 1108, controller 1110, number of sensors 1112, beacon 1113, and power source 1114.

Housing 1102 is a structure configured to support or hold the other components in soil sensor unit 1100. Housing 1102 may be comprised of a number of different types of materials. For example, housing 1102 may be comprised of at least one of plastic, metal, a composite material, a biodegradable material, biodegradable closed cell extruded polystyrene foam, polycarbonate, and other suitable types of materials.

The type of material selected for housing 1102 may depend on whether soil sensor unit 1100 is a disposable sensor unit or a recoverable sensor unit. If soil sensor unit 1100 is a disposable sensor unit, the materials selected may be based on cost, biodegradability, or some combination thereof. If soil sensor unit 1100 is selected to be a recoverable sensor unit, the materials may be selected for durability.

In these illustrative examples, transmitter 1104 is configured to transmit information over antenna 1108. Receiver 1106 is configured to receive information over antenna 1108. In some illustrative examples, transmitter 1104 and receiver 1106 may be a single component such as a transceiver.

Controller 1110 is implemented using hardware and may include software. Controller 1110 may take various forms depending on the particular implementation. For example, controller 1110 may include at least one of a processor unit, an application specific integrated circuit, a digital signal processor, or some other suitable type of hardware.

As depicted, controller 1110 is configured to control the operation of components in soil sensor unit 1100. For example, controller 1110 may control the generation of information by number of sensors 1112, the transmitting and receiving of information by transmitter 1104 and receiver 1106, and other suitable operations.

In these illustrative examples, number of sensors 1112 is configured to generate information about the soil. This information may be processed by controller 1110 prior to being transmitted to a remote location through transmitter 1104 over antenna 1108.

In these illustrative examples, number of sensors 1112 may include at least one of a temperature sensor, a moisture sensor, a pH sensor, an electroconductivity sensor, a global positioning system receiver, a nitrate sensor, a calcium sensor, and other suitable types of sensors. Depending on the configuration of soil sensor unit 1100, number of sensors 1112 may include a soil temperature sensor and moisture sensor. Other sensors also may be included in other configurations of soil sensor unit 1100.

The different sensors in number of sensors 1112 may be implemented using a number of currently available sensors. Examples of implementations for a moisture sensor include a frequency domain capacitive probe, a frequency domain reflectometry sensor, a phase transmission sensor, an amplitude domain reflectometry sensor, a time domain reflectometry sensor, a time domain transmissionmetry sensor, a soil tensiometer, a rhizon soil moisture sampler, a gravimetric soil moisture measurement sensor, a heat dissipation moisture sensor, a soil psychrometer, a resistive probe, a gypsum block sensor, a resistance block sensor, a granular matrix sensor, a neutron probe, and other suitable types of sensors.

In these illustrative examples, the type of sensor for number of sensors 1112 may be selected based on whether the sensor unit is a disposable sensor unit or a recoverable sensor unit. With a disposable sensor unit, a simple resistive probe may be used to detect moisture in the soil. Conversely, a more expensive frequency domain reflectometry sensor may be used when the sensor unit is a recoverable sensor. Of course, other types of moisture sensors may be used when number of sensors 1112 are disposable sensors or recoverable sensors depending on the particular implementation.

Moreover, the type of sensor used for number of sensors 1112 may be determined by the type of assets 1016 used to deploy the sensor. For example, for small unmanned aerial vehicles in group of unmanned aerial vehicles 1022 which may have smaller load capacities, a light-weight sensor may be used. In other cases, a larger sensor, such as a time domain reflectometer, may be deployed from a ground vehicle in assets 1016, depending on the particular implementation.

Further, number of sensors 1112 also may include one or more sensors to determine whether soil sensor unit 1100 has been deployed in a desired manner. For example, number of sensors 1112 may include an accelerometer or other devices configured to identify the orientation of soil sensor unit 1100. In yet other illustrative examples, a sensor used to generate soil information also may be used to determine whether soil sensor unit 1100 is deployed as desired. For example, a moisture sensor may be used to determine whether readings of moisture indicate that the moisture sensor has been embedded or has penetrated the ground.

As depicted, beacon 1113 is configured for use in recovering soil sensor unit 1100. Beacon 1113 may be an attention gathering device such as a light source or a sound source to attract the attention of a human operator. In other illustrative examples, beacon 1113 may be a radio frequency transmitter configured to transmit signals that may be used to locate soil sensor unit 1100.

In these illustrative examples, power source 1114 is configured to generate power used to operate the different components in soil sensor unit 1100. For example, power source 1114 may provide power to transmitter 1104, receiver 1106, controller 1110, and number of sensors 1112.

Power source 1114 may take a number of different forms. For example, power source 1114 may include at least one of energy harvesting system 1116 and battery system 1118. Energy harvesting system 1116 may be used to increase the operational life of soil sensor unit 1100. Energy harvesting system 1116 may take a number of different forms similar to those described for energy harvesting system 622 in autonomous vehicle 600 in FIG. 6. For example, energy harvesting system 1116 may include at least one of a solar energy harvester, a thermoelectric ambient energy harvester, an ambient radio frequency (RF) harvester, a soil bioelectrochemical system (BES), a microwind generator, and other suitable types of energy harvesting devices.

Battery system 1118 may be comprised of one or more batteries. When used in conjunction with energy harvesting system 1116, battery system 1118 may be recharged by energy harvesting system 1116. Battery system 1118 may include a number of batteries. The type of battery selected may depend on whether soil sensor unit 1100 is configured to be disposable or recoverable. For example, if soil sensor unit 1100 is configured to be disposable, the battery may be selected based on cost and lowering the environmental impact on the location in which the soil sensor unit is used. As an example, a low self-discharge nickel-metal hydride (NiMH) battery may be used.

If soil sensor unit 1100 is configured to be recoverable, the performance of the battery may be used as criteria for selection. For example, the battery may be a thin film battery, a super capacity energy storage device, a lithium ion battery, or some other suitable type of battery.

The selection of components for soil sensor unit 1100 may vary depending on the goals for soil sensor unit 1100. For example, if soil sensor unit 1100 is meant to be a disposable unit, the components may be selected to be as low cost as possible. For example, receiver 1106 may be omitted. As another example, housing 1102 may be selected to include a biodegradable material. With this type of implementation, soil sensor unit 1100 may only include a moisture sensor and a temperature sensor and other components in soil sensor unit 1100 may be omitted.

In other illustrative examples, soil sensor unit 1100 may be designed to be recoverable. When soil sensor unit 1100 is designed to be recoverable, soil sensor unit 1100 may include more components and may be designed to include components for use in locating soil sensor unit 1100 for recovery. For example, number of sensors 1112 may include a global positioning system receiver that generates information about the location of soil sensor unit 1100. This location information may be used to recover soil sensor unit 1100. For example, when soil sensor unit 1100 is recoverable, number of sensors 1112 may include more expensive and more sophisticated sensors. Number of sensors 1112 may include, for example, without limitation, a pH sensor, a nitrogen sensor, and other suitable types of sensors to obtain additional information about the soil.

The illustration of forestry management environment 1000 and the different components in forestry management environment 1000 in FIG. 10 and FIG. 11 are not meant to imply limitations to the manner in which an illustrative embodiment may be implemented. For example, in some illustrative examples, soil sensor unit 1100 in FIG. 11 may only include transmitter 1104 and not receiver 1106.

As another illustrative example, assets 1016 in forestry management system 1003 may include other components for generating information 1004. For example, a group of unmanned ground vehicles also may be used in assets 1016 to generate information 1004 about whether location 1006 in forest 1002 is ready for harvesting of trees 1001.

For example, although not shown in assets 1016, assets 1016 also may include planting equipment. The planting equipment may be used to plant trees 1001. In particular, the planting equipment may be used to plant trees 1001 in the form of seedlings.

As another illustrative example, information 1004 may be analyzed by forestry management system 1003 to determine whether undesired conditions are present in location 1006 in forest 1002. For example, number of soil conditions 1017 may indicate that conditions may be present that may result in a forest fire starting in or around location 1006. This identification may be used to initiate a warning mission in missions 1030.

In still another illustrative example, transmitter 1104 and receiver 1106 may be implemented as a single component in the form of a transceiver. In yet other illustrative examples, sensor system 1024 may include other devices other than ground-based sensor units 1026. For example, sensor system 1024 also may include a base station configured to receive information 1004 from ground-based sensor units 1026 and transmit information 1004 to forestry manager 1014. In this illustrative example, the base station may be powered by an energy harvesting system such as a solar power generation system.

As yet another example, soil sensor unit 1100 may be implemented using modules. For example, when soil sensor unit 1100 is a recoverable soil sensor unit, soil sensor unit 1100 may have a module similar to sensor module 616 in FIG. 6 that may be replaceable.

In yet other illustrative examples, soil sensor unit 1100 may include other components not shown in FIG. 11. For example, soil sensor unit 1100 also may include a logic circuit, a regulator, a printed circuit board, an input/output interface, a display, and other suitable components depending on the particular implementation.

Figure 12:
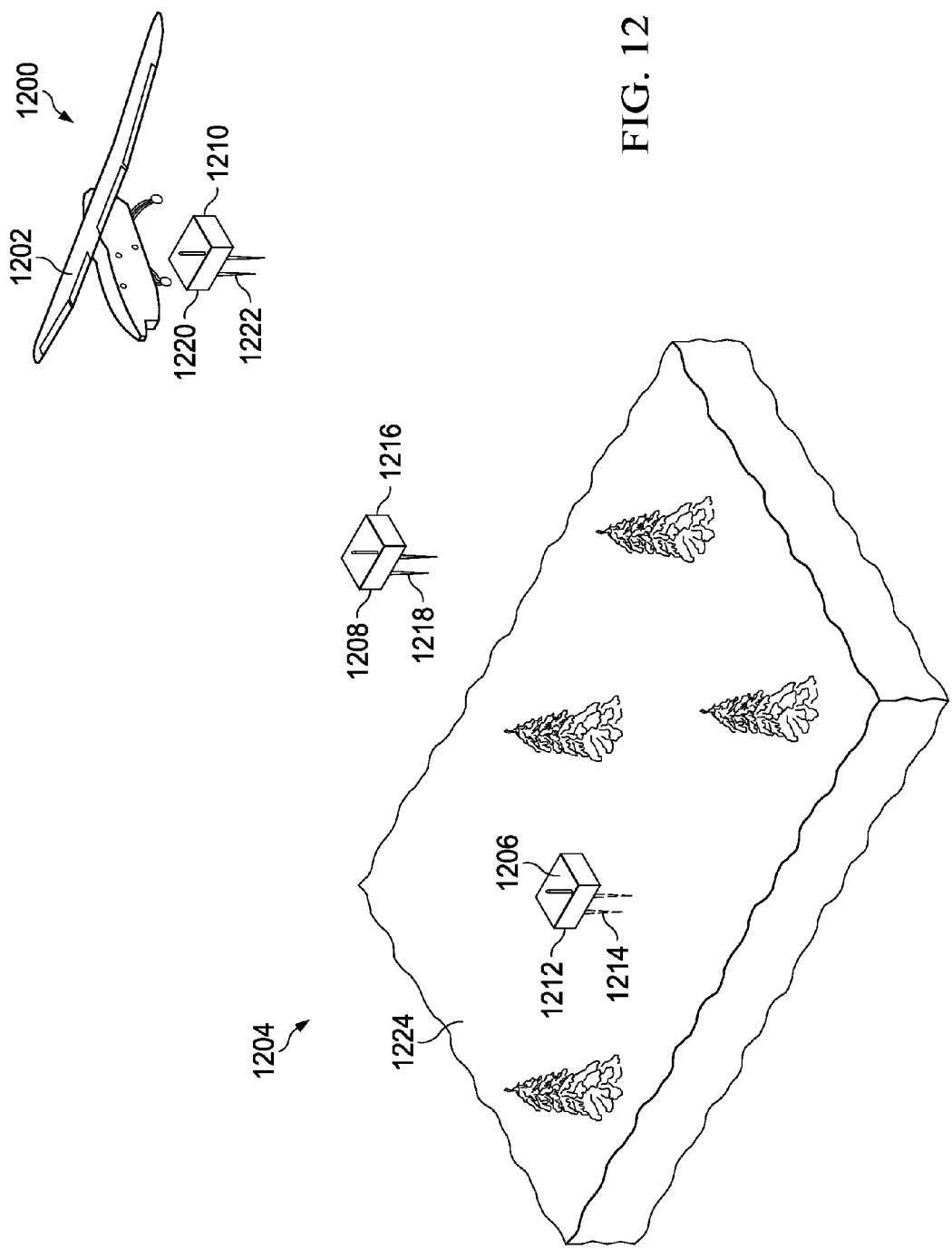
FIG. 12 is an illustration of a deployment of a sensor system for obtaining soil information in accordance with an illustrative embodiment.

Turning now to FIG. 12, an illustration of a deployment of a sensor system for obtaining soil information is depicted in accordance with an illustrative embodiment. In this illustrative example, forest area 1200 is an example of location 1006 in forest 1002 in FIG. 10. As depicted, forest area 1200 is an open location in which trees are absent. Reforestation is desirable for this particular location and soil information may be obtained to determine when and how planting of trees, such as trees 1001 in FIG. 10, should occur in forest area 1200.

In this illustrative example, unmanned aerial vehicle 1202 is configured to deploy soil sensor units 1204 in a sensor system. Unmanned aerial vehicle 1202 may be one of group of unmanned aerial vehicles 1022 in FIG. 10. The unmanned aerial vehicles collecting information generated by soil sensor units 1204 may be the same or different than the unmanned aerial vehicles that deployed soil sensor units 1204 in these illustrative examples.

As depicted, soil sensor units 1204 include soil sensor unit 1206, soil sensor unit 1208, and soil sensor unit 1210. Of course, many other sensor units may be present but not shown in this particular example.

Unmanned aerial vehicle 1202 deploys soil sensor units 1204 through an airdrop operation in which unmanned aerial vehicle 1202 drops soil sensor units 1204 while flying over forest area 1200. Soil sensor units 1204 may provide location information to unmanned aerial vehicle 1202 or other devices.

With the use of disposable sensors for soil sensor units 1204, a global positioning system transmitter may be omitted to reduce the size, weight, and cost of the soil sensor units 1204. In this case, the location of a sensor in soil sensor units 1204 may be determined using a personal identification number or an identification code. For example, each sensor in soil sensor units 1204 may be assigned a personal identification number or identification code. The identification may be recorded on the sensor using a radio-frequency identification tag attached to the sensor at time of manufacture. As the sensor is deployed, the identification is read and associated with the global positioning system coordinates of unmanned aerial vehicle 1202 at the time of the drop.

Based on the location of unmanned aerial vehicle 1202, the velocity at which the sensor is dropped, and the altitude at which the sensor is dropped, a location of the sensor may be estimated. In this manner, the location of the sensor may be estimated and recorded with reasonable precision without the need to add costly components to a disposable sensor. As a result, when unmanned aerial vehicle 1202 or other unmanned aerial vehicles collect data from soil sensor units 1204, unmanned aerial vehicle 1202 may know the location of sensors in soil sensor units 1204 with enough precision to wirelessly receive information from the sensors.

Recoverable soil sensor units 1204, on the other hand, may identify location information using other components. For example, as unmanned aerial vehicle 1202 deploys soil sensor units 1204, soil sensor units 1204 are turned on. Of course, soil sensor units 1204 may be turned on at any time including before or after deployment by unmanned aerial vehicle 1202.

Soil sensor units 1204 may transmit location information and identification information such that the location of each sensor unit can be identified. In these illustrative examples, a location may be in two-dimensional or three-dimensional coordinates depending on the particular implementation. For example, the location may be in latitude and longitude and also may include an altitude. Recoverable soil sensor units 1204 may include a global positioning system receiver in these illustrative examples.

In other illustrative examples, soil sensor units 1204 may include transmitters and not employ global positioning system receivers. Instead, soil sensor units 1204 may include radio frequency identifier tags that are configured to transmit identifiers. The coordinates of the aircraft dropping soil sensor units 1204 may be associated with the identifiers to obtain an approximate location of soil sensor units 1204.

In this example, soil sensor unit 1206 has housing 1212 and pins 1214. Soil sensor unit 1208 has housing 1216 and pins 1218. Soil sensor unit 1210 has housing 1220 and pins 1222. The pins and the housings are weighted such that the pins will fall and penetrate ground 1224 when soil sensor units 1204 reach the ground. In other words, soil sensor units 1204 are bottom heavy.

In this illustrative example, the distribution of soil sensor units 1204 may vary depending on the particular implementation. For example, soil sensor units 1204 may be deployed such that about one mile, about ten miles, or some other suitable distance is present between soil sensor units 1204. Soil sensor units 1204 may be dropped in various patterns such as a grid, a spiral, or some other suitable pattern.

In deploying soil sensor units 1204, the distance between soil sensor units 1204 may depend on the terrain of ground 1224. For example, with varying terrain such as high hills, a microclimate may be produce in a portion of the high hills. A microclimate is a local atmospheric zone where the climate may differ from surrounding areas.

As an example, one side of a hill may receive more rain than the other side. In this case, soil sensor units 1204 may be deployed closer together to take into account these microclimates. In another illustrative example where flat land is present, fewer soil sensor units 1204 may be deployed, soil sensor units 1204 may be deployed at larger intervals, or both.

In other illustrative examples, soil sensor units 1204 may be deployed based on the type of soil in ground 1224. For example, more soil sensor units 1204 may be desired in an area with soft soil than in an area with clay or rock. Moreover, soil sensor units 1204 may not be deployed in areas where streams, rivers, lakes, roads, and other features are present, depending on the particular implementation.

In still other illustrative examples, the distance between soil sensor units 1204 may depend on the desired granularity of information. For example, if a higher granularity of information is desired, more of soil sensor units 1204 may be deployed, soil sensor units 1204 may be deployed closer together, or a combination thereof.

After soil sensor units 1204 have been deployed, the soil sensor units may generate information about the soil in forest area 1200 and about other conditions in forest area 1200. For example, soil sensor units 1204 may generate information about air temperature, humidity, and other conditions in addition to conditions about the soil in ground 1224 in forest area 1200.

In this illustrative example, when soil sensor units 1204 are disposable, soil sensor units 1204 may be configured to transmit this information during selected periods of time. In this example, unmanned aerial vehicle 1202 or another unmanned aerial vehicle may fly over forest area 1200 to collect information generated by soil sensor units 1204 during those selected periods of time. As an example, soil sensor units 1204 may be programmed to transmit on preselected days and times. Unmanned aerial vehicle 1202 or other unmanned aerial vehicles may be programmed with the same schedule and may fly over soil sensor units 1204 during these preselected days and times.

The selection of times for transmission of information from soil sensor units 1204 may be determined by the flight pattern of unmanned aerial vehicle 1202 in these illustrative examples. For example, each of soil sensor units 1204 may stage transmission based on the distance between each sensor and the time it takes unmanned aerial vehicle 1202 to fly between soil sensor units in soil sensor units 1204. In this manner, transmission time and energy consumption may be minimized when transmitting information from soil sensor units 1204.

When soil sensor units 1204 are recoverable sensors, other components may be included in soil sensor units 1204. For example, soil sensor units 1204 may be equipped with a receiver. In this case, unmanned aerial vehicle 1202 may transmit a signal to "wake up" the sensors. When a sensor in soil sensor units 1204 receives the wireless order to transmit, the sensor may then respond by transmitting a data log of soil sensor measurements to unmanned aerial vehicle 1202.

As depicted, unmanned aerial vehicle 1202 may be various sizes depending on the weight and number of units present in soil sensor units 1204. For example, if each sensor unit in soil sensor units 1204 weighs about 100 grams, then fifty sensor units in soil sensor units 1204 may weigh about 5 kilograms. With this size payload, unmanned aerial vehicle 1202 may be a small to medium-sized unmanned aerial vehicle. For example, a small unmanned aerial vehicle may be about four feet in length with about a ten foot long wingspan. In other examples, a medium-sized unmanned aerial vehicle may be about 35 feet in length with about a 36 foot rotor diameter. In still other illustrative examples, a medium-sized unmanned aerial vehicle may be about 26 feet in length with about a 44 foot wingspan. Of course, other combinations of lengths, wingspans or rotor diameters may be used for small and medium-sized unmanned aerial vehicles, depending on the functionality involved.

Although unmanned aerial vehicle 1202 is shown as a fixed wing aerial vehicle in these illustrative examples, rotorcraft also may be used to implement unmanned aerial vehicle 1202. Of course, other numbers of one or more additional unmanned aerial vehicles may be used in addition to unmanned aerial vehicle 1202 to deploy soil sensor units 1204 in forest area 1200.

In other illustrative examples, other types of assets 1016 may be used to deploy soil sensor units 1204 and receive information from soil sensor units 1204. For example, a manned aerial vehicle may deploy soil sensor units 1204 when it is desired to drop a larger number of soil sensors units 1204 at one time. In another illustrative example, a ground vehicle may receive information from one or more soil sensor units 1204 in ground 1224.

With the use of unmanned aerial vehicle 1202 to deploy soil sensor units 1204, cost of deployment of soil sensor units 1204 over large areas may be reduced. In other words, deployment and data collection about locations to be reforested may be made by soil sensor units 1204 more quickly, easily, and with lower cost than currently used methods.

Figure 13:
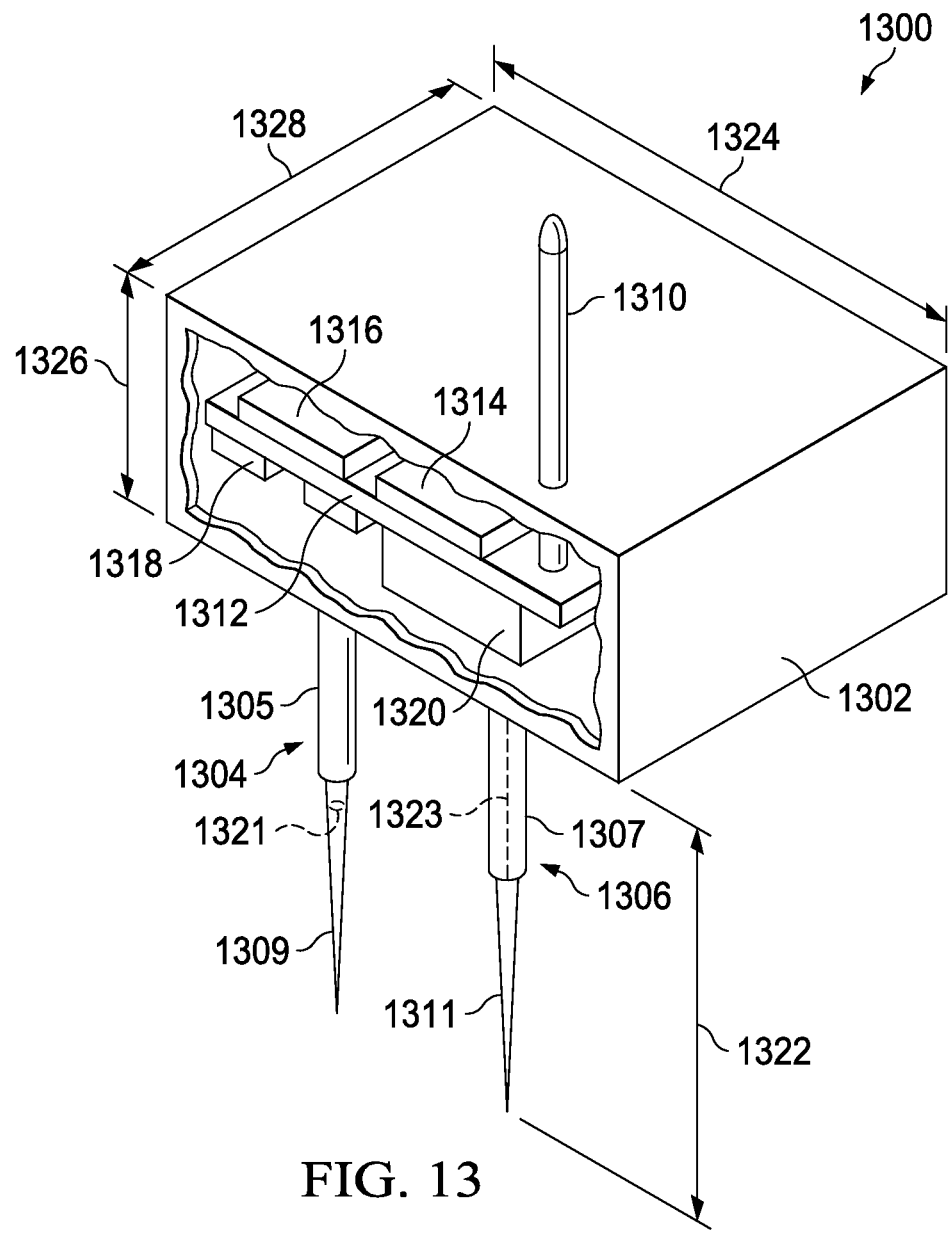
FIG. 13 is an illustration of a soil sensor unit in accordance with an illustrative embodiment.

Turning now to FIG. 13, an illustration of a soil sensor unit is depicted in accordance with an illustrative embodiment.

Soil sensor unit 1300 is an example of a physical implementation of soil sensor unit 1100 shown in block form in FIG. 11. Further, soil sensor unit 1300 may be used to implement one or more of soil sensor units 1204 in FIG. 12. More specifically, soil sensor unit 1300 may be an example of a disposable sensor unit. In other words, soil sensor unit 1300 is configured to be deployed and not retrieved in this illustrative example.

As depicted, soil sensor unit 1300 has housing 1302. Housing 1302 is configured to provide a structure to be associated with components in soil sensor unit 1300. In particular, other components may be associated with soil sensor unit 1300 by being contained in, connected to, or formed as part of housing 1302. Materials used for housing 1302 may be selected based on lowering the cost for soil sensor unit 1300. Further, housing 1302 may be comprised of a material that is biodegradable in these illustrative examples.

Soil sensor unit 1300 includes pin 1304 and pin 1306. As depicted, pin 1304 and pin 1306 are metal pins. Sensors may be associated with or formed as part of pin 1304 or pin 1306. In this illustrative example, pin 1304 and pin 1306 may function as a probe for moisture detection.

In this illustrative example, the weight of pin 1304 and pin 1306 relative to housing 1302 and the other components associated with housing 1302 is selected such that soil sensor unit 1300 is bottom heavy. In other words, soil sensor unit 1300 is configured to land with pin 1304 and pin 1306 pointing to and penetrating the ground such that pin 1304 and pin 1306 extend into the ground when soil sensor unit 1300 is deployed through an airdrop. Of course, soil sensor unit 1300 also may be deployed using a ground vehicle such as an unmanned ground vehicle that plants soil sensor unit 1300 into the ground.

Further, soil sensor unit 1300 includes antenna 1310 which is connected to printed circuit board 1312 seen inside of housing 1302 in this exposed view of housing 1302. Transmitter 1314, controller 1316, and logic circuits 1318 also are connected to printed circuit board 1312.

Transmitter 1314 is configured to transmit information using wireless communications links through antenna 1310. Controller 1316 may be, for example, a microcontroller. Controller 1316 may control the operation of soil sensor unit 1300 in collecting and transmitting information about the soil. Logic circuits 1318 may detect signals from a moisture sensor that may be implemented using pin 1304, pin 1306, or both pin 1304 and pin 1306 to generate information in a form suitable for transmission. In these illustrative examples, pin 1304 and pin 1306 may be comprised of metal, and moisture may be determined based on a measurement of the resistance between pin 1304 and pin 1306. Further, logic circuits 1318 also may include storage, memory, or other devices to temporarily store the information prior to transmission.

In some illustrative examples, pin 1304 and pin 1306 may have insulated portion 1305 and insulated portion 1307, respectively. Insulated portion 1305 and insulated portion 1307 are configured to provide a desired level of accuracy for a measurement of the resistance between pin 1304 and pin 1306 at a desired depth under the surface of the ground. For example, insulated portion 1305 and insulated portion 1307 result in pin 1304 and pin 1306 having exposed portion 1309 and exposed portion 1311, respectively. With insulated portion 1305 and insulated portion 1307 present, a measure of resistance may be made at only one depth instead of along the entire length of pin 1304 and pin 1306. As a result, measurement of resistance between pin 1304 and 1306 may be localized at a desired depth under the surface of the ground.

In other words, interference from other measurements of resistance between pin 1304 and pin 1306 along the length of pin 1304 and pin 1306 may be prevented by insulated portion 1305 and insulated portion 1307 in these illustrative examples. Thus, measurement of the resistance may be specific to a particular depth and may be more accurate than if insulated portion 1305 of pin 1304 and insulated portion 1307 of pin 1306 are absent.

Additionally, pin 1304 and pin 1306 may have exposed portion 1309 and exposed portion 1311, respectively. Exposed portion 1309 and exposed portion 1311 are configured to allow measurement of resistance between pin 1304 and pin 1306 at a desired depth underneath the soil. This depth may be predetermined by the type of soil or other suitable parameters. For example, a measure of resistance between pin 1304 and pin 1306 may be taken at the level of point 1321 in this illustrative example. This resistance measurement is used to determine the moisture content in the soil.

In this illustrative example, temperature sensor 1323 is also present in pin 1306. Temperature sensor 1323 may be a thermocouple wire in this illustrative example. Temperature sensor 1323 is insulated by insulated portion 1307 of pin 1306.

Temperature sensor 1323 helps provide a more accurate reading of moisture content in the soil as compared to only using resistance measurements. For example, when sun heats the soil and the soil warms up, the soil resistance changes. In this case, a false "dry" reading may occur from the resistance measurement between pin 1304 and pin 1306. With the use of temperature sensor 1323, soil sensor unit 1300 can correct the measurement to account for change in temperature in these illustrative examples. Of course, other types of temperature sensors may be used other than a thermocouple wire, depending on the particular implementation.

In these illustrative examples, the moisture sensor implemented using pin 1304, pin 1306, or both pin 1304 and pin 1306 may be configured based on soil type. For example, the moisture sensor may be calibrated based on information about soil type from previous soil survey missions. Because soil electrical resistance is a function of soil moisture content, soil temperature, and soil type, calibration of the moisture sensor aids soil sensor unit 1300 in providing more accurate information about soil electrical resistance.

Battery 1320 is connected to printed circuit board 1312. Battery 1320 is configured to provide power to the different components in soil sensor unit 1300.

In this illustrative example, pin 1304 and pin 1306 have length 1322. Length 1322 may vary depending on the particular implementation. In one illustrative example, length 1322 may be about 10 centimeters. For example, measurements may be made into the soil up to about 10 centimeters in the ground when soil sensor unit 1300 is deployed.

In this particular example, housing 1302 of soil sensor unit 1300 has length 1324, height 1326, and depth 1328. Length 1324 may be about 5 centimeters, height 1326 may be about 5 centimeters, and depth 1328 may be about 5 centimeters. Of course, in other illustrative examples, housing 1302 may have other dimensions or other shapes. In one illustrative example, housing 1302 may have a shape selected from one of a pyramid, a cube, or some other suitable shape other than the cuboid shown for housing 1302 in this depicted example.

Of course, the illustration of soil sensor unit 1300 in FIG. 13 is not meant to imply limitations to the manner in which different soil sensor units may be implemented. For example, in other illustrative examples, soil sensor unit 1300 also may include a receiver. Additionally, soil sensor unit 1300 also may be implemented to include an energy harvesting device in addition to or in place of battery 1320.

In still other illustrative examples, other numbers of pins may be used in addition to or in place of pin 1304 and pin

1306. For example, a single pin, three pins, seven pins, or some other number of pins may be used depending on the particular implementation. The particular components selected for soil sensor unit 1300 may be based on cost, biodegradability, or some combination thereof when soil sensor unit 1300 is a disposable sensor unit.

Figure 14:
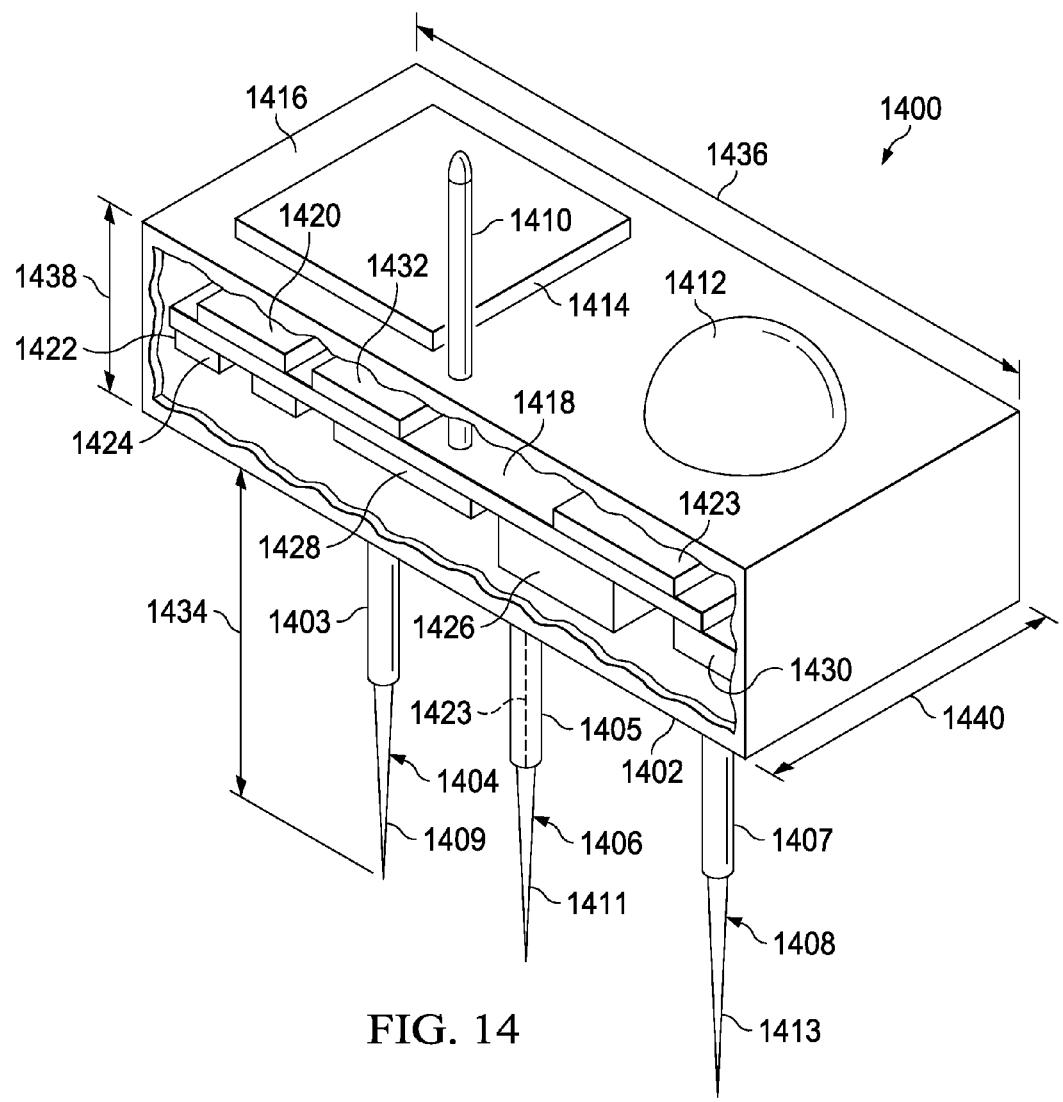
FIG. 14 is an illustration of a soil sensor unit in accordance with an illustrative embodiment.

Thus, soil sensor unit 1300 may result in more accurate information about moisture content of the soil. With the use of pin 1304, pin 1306, and temperature sensor 1323, below the surface moisture content may be measured. As a result, rapidly changing surface conditions do not affect the accuracy of soil sensor unit 1300 when measuring soil conditions below the surface of the ground. These rapidly changing surface conditions may be, for example, at least one of dew, light rainfall, evaporation, and other surface conditions Turning now to FIG. 14, an illustration of a soil sensor unit is depicted in accordance with an illustrative embodiment. Soil sensor unit 1400 is an example of a physical implementation of soil sensor unit 1100 shown in block form in FIG. 11. Further, soil sensor unit 1400 may be used to implement one or more of soil sensor units 1204 in FIG. 12. More specifically, soil sensor unit 1400 may be an example of a recoverable sensor unit. In other words, soil sensor unit 1400 is configured to be retrieved at a later time. For example, soil sensor unit 1400 may be retrieved when planting of trees occurs.

As depicted, soil sensor unit 1400 has housing 1402. Housing 1402 is configured to provide a structure to be associated with components in soil sensor unit 1400. Materials used for housing 1402 may be selected based on durability for soil sensor unit 1400. Further, housing 1402 may be comprised of at least one of metal, a plastic, aluminum, polycarbonate, polyvinyl chloride, and other suitable types of materials.

Soil sensor unit 1400 includes pin 1404 and pin 1406. As depicted, pin 1404 and pin 1406 are metal pins. Sensors may be associated with or formed as part of pin 1404 or pin 1406. In this illustrative example, pin 1404 and pin 1406 may function as a probe for moisture detection. Additionally, pin 1408 is associated with pin 1404 and may generate information about the soil.

As depicted, pin 1404, pin 1406, and pin 1408 have insulated portion 1403, insulated portion 1405, and insulated portion 1407, respectively. Insulated portion 1403, insulated portion 1405, and insulated portion 1407 may provide for more accurate measurements of resistance between any two of pin 1404, pin 1406, and pin 1408 at a desired depth under the surface of the ground.

Additionally, pin 1404, pin 1406, and pin 1408 have exposed portion 1409, exposed portion 1411, and exposed portion 1413, respectively. Resistance between two exposed portions of the pins in soil sensor unit 1400 may be used to determine the moisture level of the soil.

Temperature sensor 1423 may also be included in pin 1406 in these illustrative examples. Temperature sensor 1423 may be a thermocouple wire and may provide temperature information for soil sensor unit 1400.

In these illustrative examples, sensors may be associated with at least one of pin 1404, pin 1406, and pin 1408 to generate soil information about soil in the ground when soil sensor unit 1400 is deployed. For example, the sensors may include at least one of a moisture sensor, a temperature sensor, a pH sensor, a nitrogen and nutrient content sensor, a salt content sensor, and other suitable types of sensors. As depicted, the weight of pin 1404 and pin 1406 relative to housing 1402 and the other components associated with housing 1402 is selected such that soil sensor unit 1400 is bottom heavy for deployment in an airdrop.

In this example, antenna 1410, beacon 1412, and solar cell 1414 are seen on exterior surface 1416 of housing 1402. Solar cell 1414 is an example of an energy harvesting device that may be used to provide power to components in soil sensor unit 1400.

Beacon 1412 may be configured to assist in recovery of soil sensor unit 1400. Beacon 1412 may be, for example, at least one of a light emitting diode, a speaker, and other suitable types of attention attraction devices for human operators.

As can be seen in this exposed view of housing 1402, soil sensor unit 1400 also includes a number of different components. Printed circuit board 1418 provides a structure for a number of different components within housing 1402. Additionally, printed circuit board 1418 may also provide for electrical communication between different components in soil sensor unit 1400. In this illustrative example, microcontroller 1420, logic circuits 1422, global positioning system receiver and antenna 1410, power regulator 1424, battery 1426, energy harvesting circuit 1428, input/output interface 1430, and transceiver 1432 are connected to printed circuit board 1418. Additionally, antenna 1410, beacon 1412, solar cell 1414, pin 1404, pin 1406, and pin 1408 also are connected to printed circuit board 1418.

In this illustrative example, energy harvesting circuit 1428 is configured to manage power generated by solar cell 1414. Power regulator 1424 is configured to control the storage of power in battery 1426 and the distribution of power to different components in soil sensor unit 1400. Further, in this illustrative example, transceiver 1432 also allows the receipt of signals in addition to transmitting signals. These signals may be exchanged with at least one of an unmanned aerial vehicle, a control station, another soil sensor unit, and other suitable types of devices. Thus, in contrast to soil sensor unit 1300, soil sensor unit 1400 also may receive requests, data, commands, and other information for use in generating information about the soil.

The illustration of soil sensor unit 1400 is not meant to imply physical or architectural limitations to the manner in which an illustrative embodiment may be implemented. For example, although three pins are illustrated for soil sensor unit 1400, fewer or more pins may be used.

In yet other illustrative examples, beacon 1412 may be omitted. In this implementation, location information generated by global positioning system receiver and antenna 1410 may be used to locate and recover soil sensor unit 1400. As another illustrative example, although this example employs solar cell 1414, other types of energy harvesting devices may be used in addition to or in place of solar cell 1414 to improve the operational life of soil sensor unit 1400.

In this illustrative example, pin 1404, pin 1406, and pin 1408 have length 1434. Housing 1402 has length 1436, height 1438, and depth 1440. Length 1436 may be about 5 centimeters, height 1438 may be about 5 centimeters, and depth 1440 may be about 5 centimeters. Of course, housing 1402 may have other dimensions, depending on the particular implementation.

Further, the desired level of accuracy may be a factor in determining the design of soil sensor unit 1400. In particular, when soil sensor unit 1400 is recoverable, a frequency domain sensor such as a frequency domain capacitive probe may be used in place of a resistive sensor. In this case, the frequency domain capacitive probe may provide a more durable design and more accurate information about soil conditions. However, this type of design may increase the cost of soil sensor unit 1400.

Figure 15:
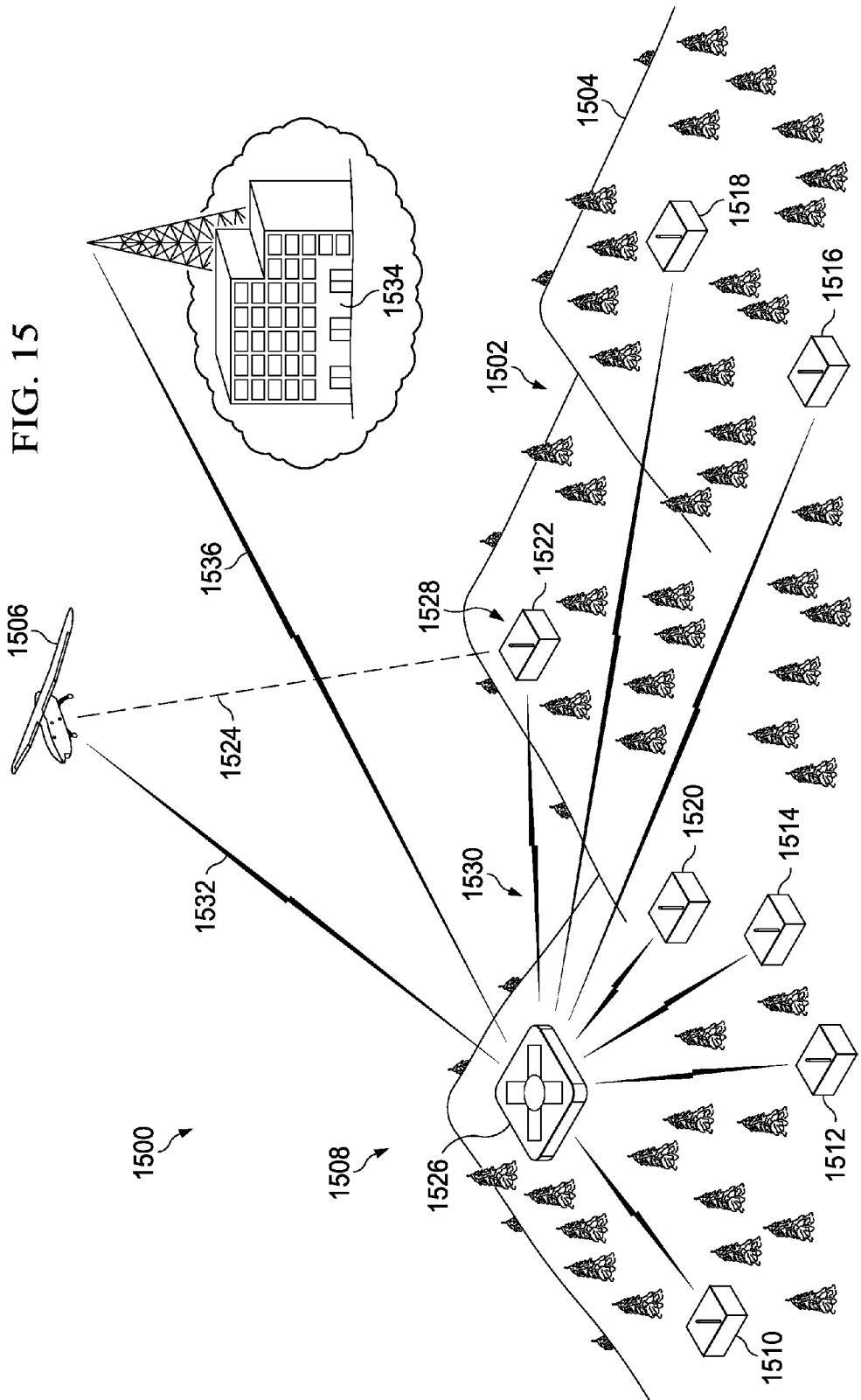
FIG. 15 is an illustration of a forest area in accordance with an illustrative embodiment.

Turning now to FIG. 15, an illustration of a forest area is depicted in accordance with an illustrative embodiment. In this depicted example, forest area 1500 is another example of location 1006 in forest 1002 in FIG. 10.

As depicted, forest area 1500 is an area in which trees 1502 are present. In this depicted example, ground 1504 in forest area 1500 is hilly or mountainous. In this illustrative example, unmanned aerial vehicle 1506 may deploy soil sensor units 1508 into forest area 1500. Soil sensor units 1508 include soil sensor unit 1510, soil sensor unit 1512, soil sensor unit 1514, soil sensor unit 1516, soil sensor unit 1518, soil sensor unit 1520, and soil sensor unit 1522.

These soil sensor units may be deployed various distances apart. These distances may be determined by a desired level of accuracy of information. For example, soil sensor unit 1510 and soil sensor unit 1512 may be one mile apart to achieve a desired level of accuracy of information in these illustrative examples. Of course, soil sensor unit 1510 and soil sensor unit 1512 may be farther apart or closer together, depending on the particular implementation. For example, soil sensor unit 1510 and soil sensor unit 1512 may be one-half mile apart, two miles apart, five miles apart, or some other distance apart in these illustrative examples. As a result, fewer soil sensor units may be used in forest area 1500 to provide a desired level of accuracy of information for soil conditions in ground 1504 than with currently used systems.

With the use of fewer soil sensor units, the cost of generating information about soil in ground 1504 may be reduced. In other illustrative examples, when more soil sensor units 1508 are desired in forest area 1500, the low cost of soil sensor units 1508 and the higher quality of information generated by soil sensor units 1508 provides more accurate information about soil conditions at a lower cost than with currently used methodologies.

In these illustrative examples, soil sensor units 1508 are configured to generate information about the soil in ground 1504. This information may be information about a number of conditions of the soil in ground 1504. In particular, the information may include moisture content.

The moisture content measurements may be used to determine whether soil conditions are favorable for harvesting operations for trees 1502 in forest area 1500. In particular, in addition to having a desired size, the soil in ground 1504 in forest area 1500 may require a desired moisture level such that equipment moving into forest area 1500 can do so with a desired level of operation. In other words, the moisture content in the soil in ground 1504 may be used to determine whether ground 1504 has a desired stability for equipment that may be used to harvest trees 1502 to operate.

In these illustrative examples, unmanned aerial vehicle 1506 also may deploy transceiver 1526. Transceiver 1526 may be used to receive information from soil sensor units 1508 and relay or send that information to another location. This location may be at least one of unmanned aerial vehicle 1506, a manned ground vehicle, control station 1534, or other suitable locations.

In this illustrative example, unmanned aerial vehicle 1506 may fly over forest area 1500 after deployment of soil sensor units 1508 and obtain information about the soil in ground 1504 from soil sensor units 1508 via transceiver 1526. The information may include soil information as well as information about soil sensor units 1508. In particular, the information about soil sensor units 1508 may include the location of soil sensor units 1508.

As depicted, unmanned aerial vehicle 1506 may fly at a desired distance above ground 1504 to collect information from soil sensor units 1508. This distance may be determined by the height of the trees, the location of soil sensor units 1508, the level of power of the transmitter in soil sensor units 1508, a predetermined flight pattern for unmanned aerial vehicle 1506, the type of unmanned aerial vehicles used, or other suitable parameters.

For example, with some types of unmanned aerial vehicles, the unmanned aerial vehicle may fly close to ground 1504 to collect information from soil sensor units 1508. In these illustrative examples, the height at which unmanned aerial vehicle 1506 may fly over ground 1504 may be determined by the power of the transmitter in soil sensor units 1508 and the sensitivity of the receiver in unmanned aerial vehicle 1506.

As an example, if soil sensor units 1508 have a transmitter with a range of about two kilometers, unmanned aerial vehicle 1506 may fly at a height less than two kilometers in these illustrative examples. Of course, transmitters with other ranges may be used and thus, unmanned aerial vehicle 1506 may fly at different heights, depending on the particular implementation. At higher altitudes, unmanned aerial vehicle 1506 may fly at higher speeds and may collect information from soil sensor units 1508 more quickly than when flying at lower altitudes.

In these illustrative examples, the location may be identified using global positioning system receivers in soil sensor units 1508. However, the canopy in trees 1502 may block global positioning system signals from reaching global positioning system receivers in soil sensor units 1508 on ground 1504 in forest area 1500.

In this instance, the location of soil sensor units 1508 may be identified from trajectories of soil sensor units 1508 as they were deployed from unmanned aerial vehicle 1506. For example, trajectory 1524 of soil sensor unit 1522 may be used to identify location 1528 of soil sensor unit 1522 on ground 1504. Trajectory 1524 of soil sensor unit 1522 may be identified from location information transmitted using global positioning system receivers while soil sensor unit 1522 moves along trajectory 1524 above the tree canopy in trees 1502.

In other illustrative examples, the locations of soil sensor units 1508 may be determined by the global positioning coordinates of unmanned aerial vehicle 1506 at the time of deployment of soil sensor units 1508. In this case, the location of unmanned aerial vehicle 1506 at the time of deployment of soil sensor units 1508 may provide a desired level of accuracy to receive wireless communications from soil sensor units 1508. In other words, the range of a transmitter on a soil sensor unit in soil sensor units 1508 may be such that the location of soil sensor units 1508 may be determined with a desired level of accuracy to collect information about soil conditions.

The location and soil information may be sent from soil sensor units 1508 to transceiver 1526 through communications links 1530. In turn, transceiver 1526 may send this information to another location for analysis. For example, the information may be sent from transceiver 1526 to unmanned aerial vehicle 1506 through wireless communications link 1532. In another illustrative example, transceiver 1526 may send the information to control station 1534 over wireless communications link 1536. In these examples, information may be sent to control station 1534 via other sensors in the form of a mesh network. Of course, in some illustrative examples, soil sensor units 1508 may send the information directly to an information collection vehicle when transceiver 1526 is not being used.

Figure 16:
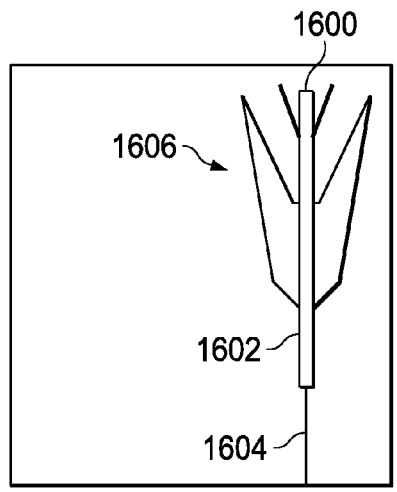
FIG. 16 is an illustration of a soil sensor aerial deployment unit in accordance with an illustrative embodiment.

Turning now to FIG. 16, an illustration of a soil sensor aerial deployment unit is depicted in accordance with an illustrative embodiment. As depicted, soil sensor unit 1600 is an example of a physical implementation of soil sensor unit 1100 shown in block form in FIG. 11. Further, soil sensor unit 1600 may be used to implement one or more of soil sensor units 1508 in FIG. 15.

As depicted, soil sensor unit 1600 has a configuration similar to a dart. In this illustrative example, soil sensor unit 1600 has housing 1602. Probe 1604 is associated with and extends from housing 1602.

Additionally, soil sensor unit 1600 also includes fins 1606. The shape of housing 1602, the configuration of fins 1606, and the configuration of probe 1604 are configured such that probe 1604 enters the ground when soil sensor unit 1600 is deployed. Further, soil sensor unit 1600 is configured to be deployed in an already established forest, the shape of soil sensor unit 1600 may be such that soil sensor unit 1600 penetrates and passes through a forest canopy.

Soil sensor unit 1600 may include other components within housing 1602. In this illustrative example, these components may be similar to those shown in other examples of soil sensor units such as soil sensor unit 1300 in FIG. 13 and soil sensor unit 1400 in FIG. 14.

The illustration of the deployment of soil sensor units and implementations for soil sensor units in FIGS. 13-16 are only meant as examples of some implementations and not mean to limit the manner in which soil sensor units may be deployed or constructed. For example, the soil sensor units may have other shapes such as cubes, pyramids, or other suitable shapes. Additionally, different types of soil sensor units may be used in the same location. In other words, soil sensor units may be heterogeneous in type and not necessarily homogenous.

Figure 17:
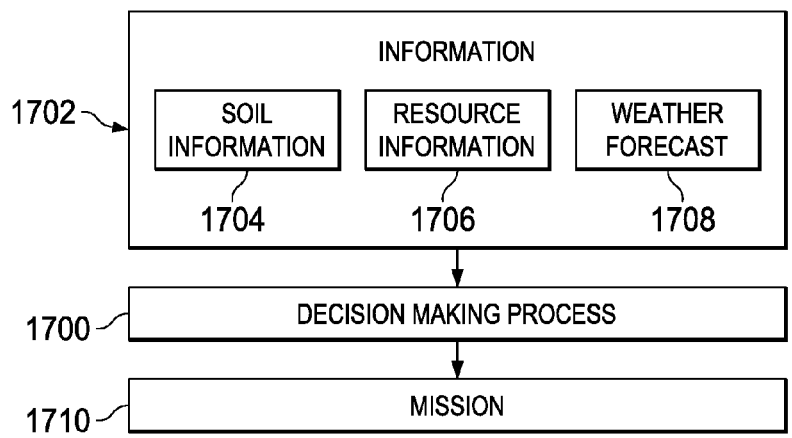
FIG. 17 is an illustration of a model of decision making for planting trees in accordance with an illustrative embodiment.

Turning now to FIG. 17, an illustration of a model of decision making for in-filling recently planted areas of a forest is depicted in accordance with an illustrative embodiment. As depicted, decision making process 1700 is an example of a process that may be implemented in forestry manager 1014 in FIG. 10.

In this illustrative example, decision making process 1700 may use a number of types of information to perform planting of trees. This information includes information in addition to information 1004 generated by assets 1016 in FIG. 10.

As depicted, information 1702 includes soil information 1704, resource information 1706, weather forecast 1708, and other suitable types of information. Foresters may use soil information 1704, resource information 1706, weather forecast 1708, and other suitable types of information to determine a plan for planting trees 1001 in FIG. 10. Foresters may use their forestry experiences, as well as information 1702 to make decisions about planting trees 1001. In other illustrative examples, soil information 1704, resource information 1706, weather forecast 1708, and other suitable types of information may be used by a device with a desired level of intelligence to automate a portion or all of the decision-making process to generate mission 1710.

In this example, soil information 1704 may include at least one of soil moisture conditions, soil temperature conditions, soil conductivity, nitrogen content, pH, calcium content, salt content, nutrient content, and other suitable types of information about soil conditions. Resource information 1706 may include an identification of at least one of planting equipment, human operators, and other resources that may be used to plant trees. Weather forecast 1708 includes forecasts for the area in which the planting of trees is desired. This weather forecast information may include forecasts for rain, temperature, and other weather conditions.

Mission 1710 is generated by decision making process 1700 using information 1702. In this illustrative example, mission 1710 is a planting mission and may include at least one of a desired time to plant trees, a type of seedlings, planting density, fertilization strategies, and other suitable types of information. In this manner, decision making process 1700 takes into account than currently used. Currently, obtaining soil information 1704 to make good decisions is cost prohibitive. Thus, the current methods do not support identification of the type of seedlings to use. Further, currently employed decision making processes may not be implemented in hardware such as forestry manager 1014. Thus, decision making process 1700 takes into account a greater number of different types of factors in generating mission 1710 than currently used decision making processes for planting trees in the forest.

Figure 18:
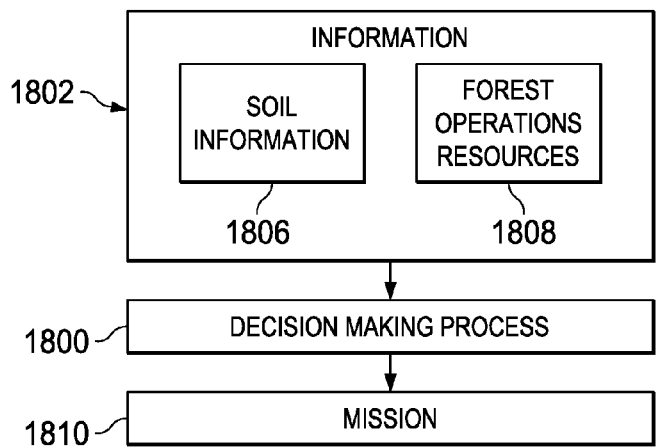
FIG. 18 is an illustration of a model of decision making for in-filling recently planted areas of a forest in accordance with an illustrative embodiment.

Turning now to FIG. 18, an illustration of a model of decision making for harvesting trees is depicted in accordance with an illustrative embodiment. As depicted, decision making process 1800 is an example of a process that may be implemented in forestry manager 1014 in FIG. 10. In this illustrative example, decision making process 1800 may use a number of types of information to perform harvesting of trees. This information includes information in addition to information 1004 generated by assets 1016 in FIG. 10.

In this example, information 1802 includes soil information 1806. Soil information 1806 may include a number of soil conditions that indicate the stability of the ground in the area for operating equipment. Additionally, information 1802 also may include forest operations resources 1808. Forest operation resources 1808 may include an identification of harvesting equipment, trucks for carrying trees, human operators, and other resources that may be used for forest management.

As depicted, decision making process 1800 uses information 1802 to generate mission 1810. Mission 1810 is a forest operation and may indicate when harvesting may occur. Further, in some illustrative examples, forest operation mission 1810 also may include an identification of what equipment may be used if constraints are present or when operations may occur. For example, if a three month period is provided for harvesting trees, the type of harvesting equipment that may be used may be based on soil conditions identified at different times during the three month period of time. As an example, different equipment may be used during different months or weeks depending on the soil conditions and how the soil conditions affect the stability of the ground with respect to using different types of equipment.

Turning now to FIG. 19, an illustration of a flowchart of a process for managing a forest is depicted in accordance with an illustrative embodiment. The process illustrated in FIG. 19 may be implemented in forestry management environment 200 in FIG. 2. In particular, the process may be implemented using forestry manager 202 in FIG. 2.

The process begins by receiving information about a forest from a group of autonomous vehicles (operation 1900). The process analyzes the information to generate a result about a state of the forest from the information (operation 1902). The process then coordinates operation of the group of autonomous vehicles using the result (operation 1904) with the process terminating thereafter.

Turning now to FIG. 20, an illustration of a flowchart of a process for processing information received from assets is depicted in accordance with an illustrative embodiment. The process illustrated in FIG. 20 may be implemented in forestry manager 202 in FIG. 2.

The process begins by receiving information from assets (operation 2000). In these illustrative examples, the assets may take various forms. In particular, the assets may be a group of autonomous vehicles that may operate to collect information without human intervention. Specifically, the group of autonomous vehicles may operate as a swarm or as a group of swarms.

The information is analyzed to obtain a result (operation 2002). A state of a forest is identified from the result (operation 2004) with the process terminating thereafter. In these illustrative examples, the result may take various forms such as identifying a state of forest health, forest inventory, safety risks, illegal activity, and other states.

With reference now to FIG. 21, an illustration of a flowchart of a process for coordinating the operation of assets is depicted in accordance with an illustrative embodiment. The process illustrated in FIG. 21 may be implemented in forestry manager 202 in FIG. 2. Further, this process may be implemented to use assets 204 such as group of autonomous vehicles 226 in FIG. 2.

The process begins by identifying a mission (operation 2100). This mission may be identified based on at least one of user input, a state of the forest, and other suitable information. For example, user input may select a particular mission to be performed in the forest. In other examples, forestry manager 202 may generate missions based on the state of the forest.

The process identifies tasks for the mission identified (operation 2102). These tasks may be obtained from a pre-selected template of tasks for missions. In other illustrative examples, the tasks may be generated by forestry manager 202 when forestry manager 202 has a level of intelligence that allows for formulating tasks. For example, forestry manager 202 may implement artificial intelligence processes. Next, the process identifies assets that are available for performing the tasks (operation 2104). In these illustrative examples, the assets may be a portion or all of a group of autonomous vehicles that are available for use by the forestry manager.

The process then selects autonomous vehicles for performing the tasks (operation 2106). In these illustrative examples, each autonomous vehicle may be assigned a task or a group of autonomous vehicles may be assigned one or more tasks to perform the tasks as a swarm. The process then sends the tasks to the autonomous vehicles selected (operation 2108) with the process terminating thereafter.

Figure 22:
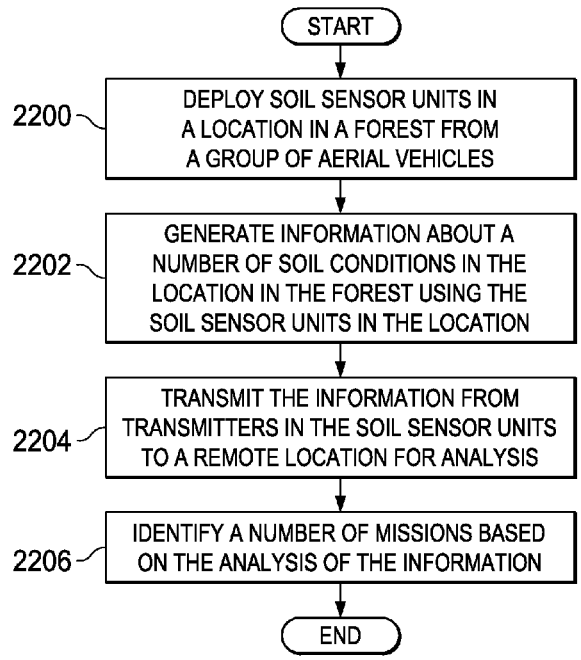
FIG. 22 is an illustration of a flowchart of a process for managing a location in accordance with an illustrative embodiment.

Turning now to FIG. 22, an illustration of a flowchart of a process for managing a location is depicted in accordance with an illustrative embodiment. The process illustrated in FIG. 22 may be used to manage a location such as a forest area. In this example, the forest area may be location 1006 in forest 1002 in forest management environment 1000 in FIG. 10. Further, the process illustrated in FIG. 22 may be implemented using forestry management system 1003 in FIG. 10.

The process begins by deploying soil sensor units in a location in a forest from a group of aerial vehicles (operation 2200). In this illustrative example, a group of items means one or more items. For example, a group of aerial vehicles is one or more aerial vehicles. In this case, an aerial vehicle in the group of aerial vehicles may be selected from one of an unmanned aerial vehicle and a manned aerial vehicle. Both manned and unmanned aerial vehicles may be included in the group of aerial vehicles, depending on the particular implementation.

The process then generates information about a number of soil conditions in the location in the forest using the soil sensor units in the location (operation 2202). The process then transmits the information from transmitters in the soil sensor units to a remote location for analysis (operation 2204). Based on the analysis of the information, a number of missions may be identified (operation 2206) with the process terminating thereafter. The identification of the mission may merely identify the type of mission needed. In other illustrative examples, the identification of the mission may include identifying tasks and assets for performing the mission. In these illustrative examples, the number of missions may include at least one of a planting mission, a harvesting mission, a soil condition identification mission, a fire condition warning mission, a forest maintenance mission, and a forest inventory mission.

Figure 23:
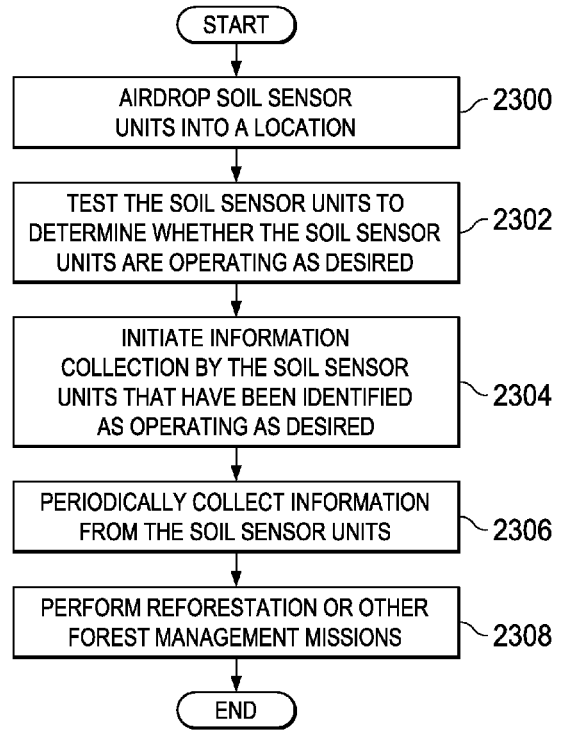
FIG. 23 is an illustration of a flowchart of a process for obtaining information about a number of soil conditions in a location in a forest in accordance with an illustrative embodiment.

Turning now to FIG. 23, an illustration of a flowchart of a process for obtaining information about a number of soil conditions in a location in a forest is depicted in accordance with an illustrative embodiment. The process illustrated in FIG. 23 is another example of a process that may be used to obtain information 1004 about location 1006 in forest 1002 in FIG. 10.

The process begins by airdropping soil sensor units into a location (operation 2300). The process then tests the soil sensor units to determine whether the soil sensor units are operating as desired (operation 2302). This testing may be used to determine whether the soil sensor units are operating and are in desired locations. For example, if a soil sensor unit does not penetrate the ground, the information generated may not be as accurate as desired. This identification may be made by determining whether other soil sensor units around or in a location near the soil sensor unit are generating information about soil conditions that are within an expected range for operating correctly.

In another illustrative example, the testing may determine whether the soil sensor unit has landed properly and penetrated the ground as opposed to bouncing off an object such as a log, tree, rock, or merely landed on the ground without penetrating. For example, the testing of the soil sensor units may include obtaining information from an orientation sensor to determine the orientation of the soil sensor unit. A vertical orientation may imply that the soil sensor unit has penetrated the ground. A non-vertical orientation may imply that the soil sensor unit may have landed on the ground without penetrating the ground.

As another example, information may be obtained from a photometer in the soil sensor unit to determine whether the soil sensor unit has penetrated the ground. If no light is detected, an implication may be made that the soil sensor unit has penetrated the ground. If the photometer indicates that some light is detected, then the soil sensor unit may have penetrated the canopy of the forest but not the ground.

The process then initiates information collection by the soil sensor units that have been identified as operating as desired (operation 2304). This initiation may be generated by signals sent from a source such as an unmanned aerial vehicle, a transceiver, or some other suitable device.

The process then periodically collects information from the soil sensor units (operation 2306). This periodical collection may occur in a number of different ways. For example, the soil sensor units may be configured to transmit information periodically during selected time intervals. In other illustrative examples, the information may be collected by sending signals to the soil sensor units collecting the information.

Thereafter, reforestation or other forest management missions may be performed (operation 2308) with the process terminating thereafter. The harvesting operations include harvesting trees. Additionally, recovery operations may be performed to recover soil sensor units and any transceivers that are in the area. The soil sensor units and transceivers may then be used in other airdrops for other locations to determine whether conditions are present for harvesting trees in those locations.

Figure 24:
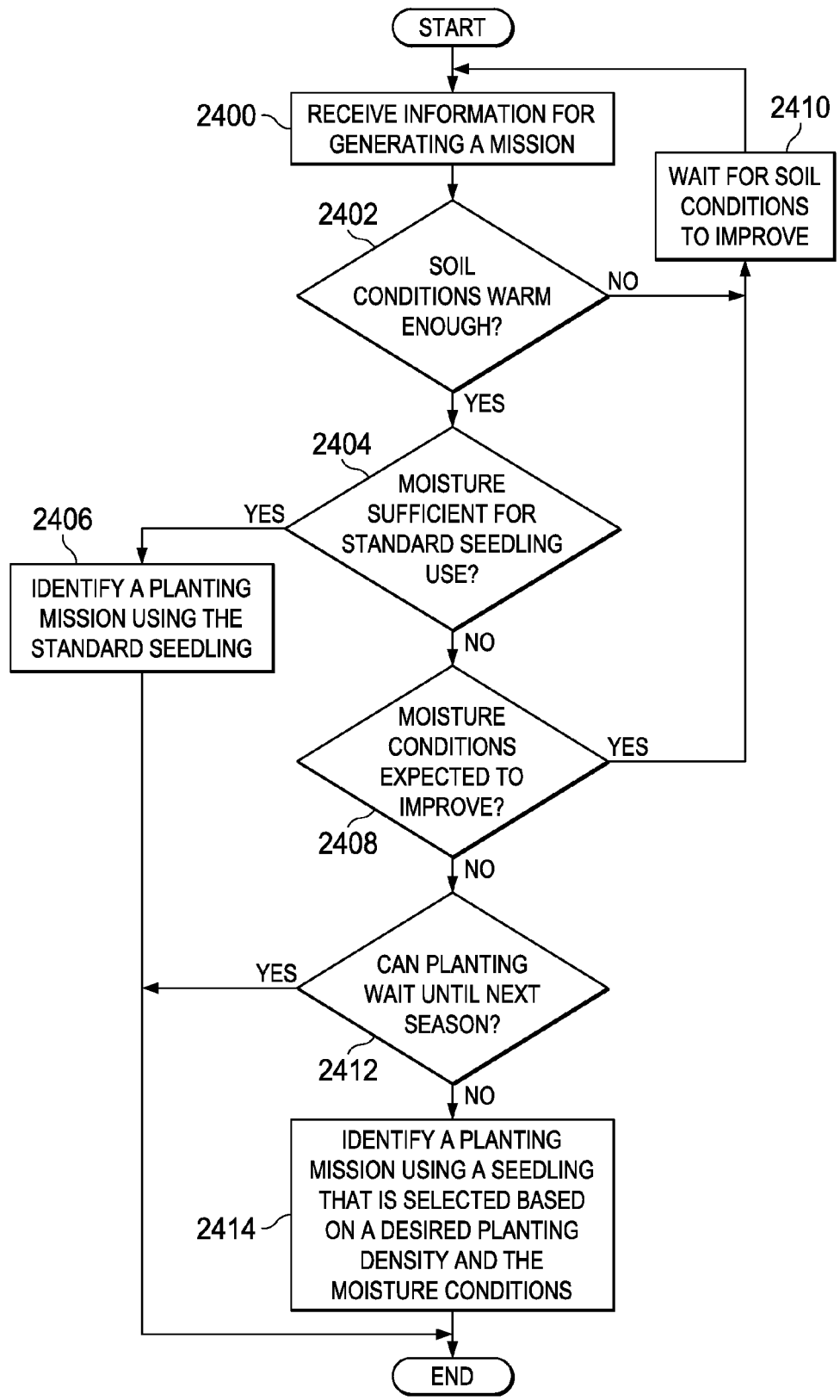
FIG. 24 is an illustration of a flowchart of a process for generating a mission in accordance with an illustrative embodiment.

Turning now to FIG. 24, an illustration of a flowchart of a decision making process for generating a mission is depicted in accordance with an illustrative embodiment. The process illustrated in FIG. 24 is an example of operations that may be performed by decision making process 1700 in FIG. 17 when implemented in forestry manager 1014 in FIG. 10.

The process begins by receiving information for generating a mission (operation 2400). This information may include, for example, without limitation, information about a number of soil conditions, harvesting resources, weather forecasts, and other suitable information.

A determination is made as to whether the soil conditions are warm enough for planting seedlings (operation 2402). The determination in operation 2402 may be made using soil information received from soil sensor units.

If the soil conditions are warm enough, a determination is made as to whether the moisture in the soil is sufficient for using a standard seedling (operation 2404). The information about the moisture in the soil also may be in soil information received from soil sensor units. If the soil condition is sufficient for using the standard seedling, a planting mission is identified using the standard seedling (operation 2406) with the process terminating thereafter.

Otherwise, a determination is made as to whether moisture conditions are expected to improve within a selected period of time (operation 2408). The determination in 2408 may be made using weather forecast information. The selected period of time may be one selected based on available resources, harvesting requirements, and other factors. The selected period of time may be a week, a month, or some other suitable period of time.

If the soil conditions are expected to improve, the process waits for the soil conditions to improve (operation 2410) with the process returning to operation 2400 as described above. This mission may be used to obtain more soil information at a later period of time.

If the moisture conditions are not expected to improve within the selected period of time, a determination is made as to whether the planting of trees can wait until the next season (operation 2412). If the planting of seedlings can wait until the next season, the process terminates. Otherwise, a planting mission is identified using a seedling that is selected based on a desired planting density and the moisture conditions (operation 2414) with the process terminating thereafter. The selected planting density may be a planting density to account for greater expected mortality. The seedling selected for planting in operation 2414 may be a containerized seedling or may be some other type of seedling, depending on the particular implementation.

With reference again to operation 2402, if the soil conditions are not warm enough, the process returns to operation 2410 to identify a forest inventory mission.

Figure 25:
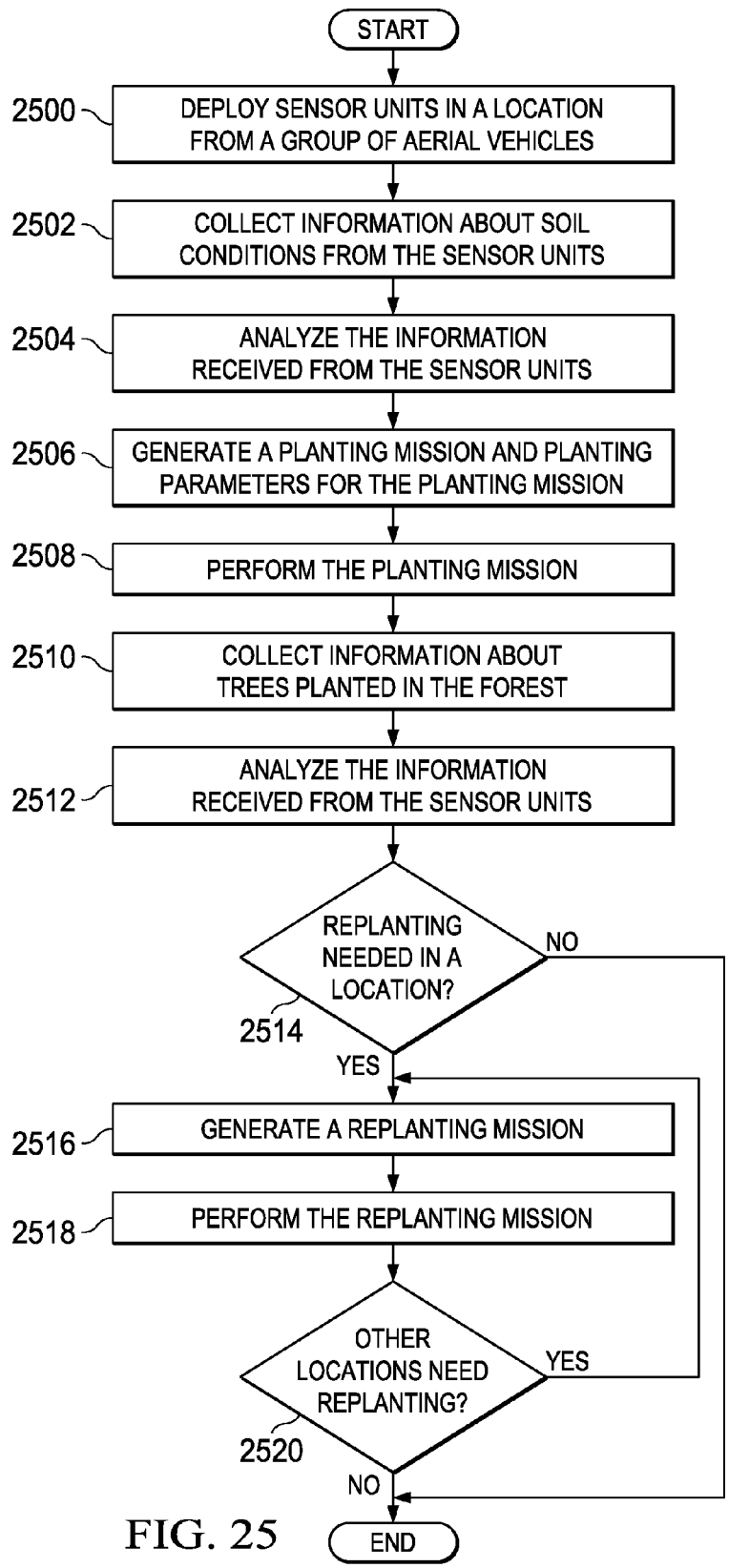
FIG. 25 is an illustration of a flowchart of a decision making process for generating and performing a mission in accordance with an illustrative embodiment.

With reference now to FIG. 25, an illustration of a flowchart of a decision making process for generating and performing a mission is depicted in accordance with an illustrative embodiment. The process illustrated in FIG. 25 is an example of operations that may be performed by decision making process 1700 in FIG. 17 when implemented in forestry manager 1014 in FIG. 10. Further, the process illustrated in this figure may be used by assets 1016 to perform missions 1030 in FIG. 10.

The process begins by deploying sensor units in a location from a group of aerial vehicles (operation 2500). The location may be location 1006 in forest 1002 in FIG. 10. The location may be in unplanted forest land in this illustrative example. The sensor units deployed by the group of aerial vehicles may be soil sensor units or other types of sensor units, depending on the particular implementation.

Next, the process collects information about soil conditions from the sensor units (operation 2502). The information received from the sensor units is analyzed (operation 2504). The process then generates a planting mission and planting parameters for the planting mission (operation 2506). These planting parameters may be planting time, type of seedlings used, spacing of trees, quantity of fertilizer needed, type of fertilizer needed, or other suitable types of parameters for planting of trees in an unplanted forest area.

The planting mission is performed (operation 2508). After a period of time, information about trees planted in the forest is collected by the sensor units (operation 2510). This information may include planting density of seedlings planted in the forest, rate of growth of the seedlings, soil conditions, or other types of information. The information received from the sensor units is analyzed (operation 2512).

Next, a determination is made as to whether replanting is needed in a location in the forest (operation 2514). Replanting may be needed in sparse areas of the forest, in areas where seedlings are not growing as desired, in areas where the forest is not as dense as desired, or a combination thereof.

If replanting is needed, the process generates a replanting mission based on the analysis of the information received from the sensor units (operation 2516). This replanting mission may include parameters such as time of replanting, type of seedlings used, location of replanting, quantity of fertilizer needed, and other parameters. The replanting mission is performed (operation 2518). Next, a determination is made as to whether other locations in the forest need replanting (operation 2520).

If other locations of the forest need replanting, the process returns to operation 2516 as described above. Otherwise, the process terminates. With reference again to operation 2514, if replanting is not needed, the process terminates.

Thus, the deployment of sensor units from the group of unmanned aerial vehicles with an illustrative embodiment provides information about the forest to generate a number of different types of missions. These missions may be performed to more easily and successfully plant trees, replant trees, conduct a forest inventory, or harvest trees in a location in the forest. Further, cost will be reduced because weather conditions, soil conditions, and other factors may be taken into account in generating the appropriate missions for planting and replanting trees in the forest.

Figure 26:
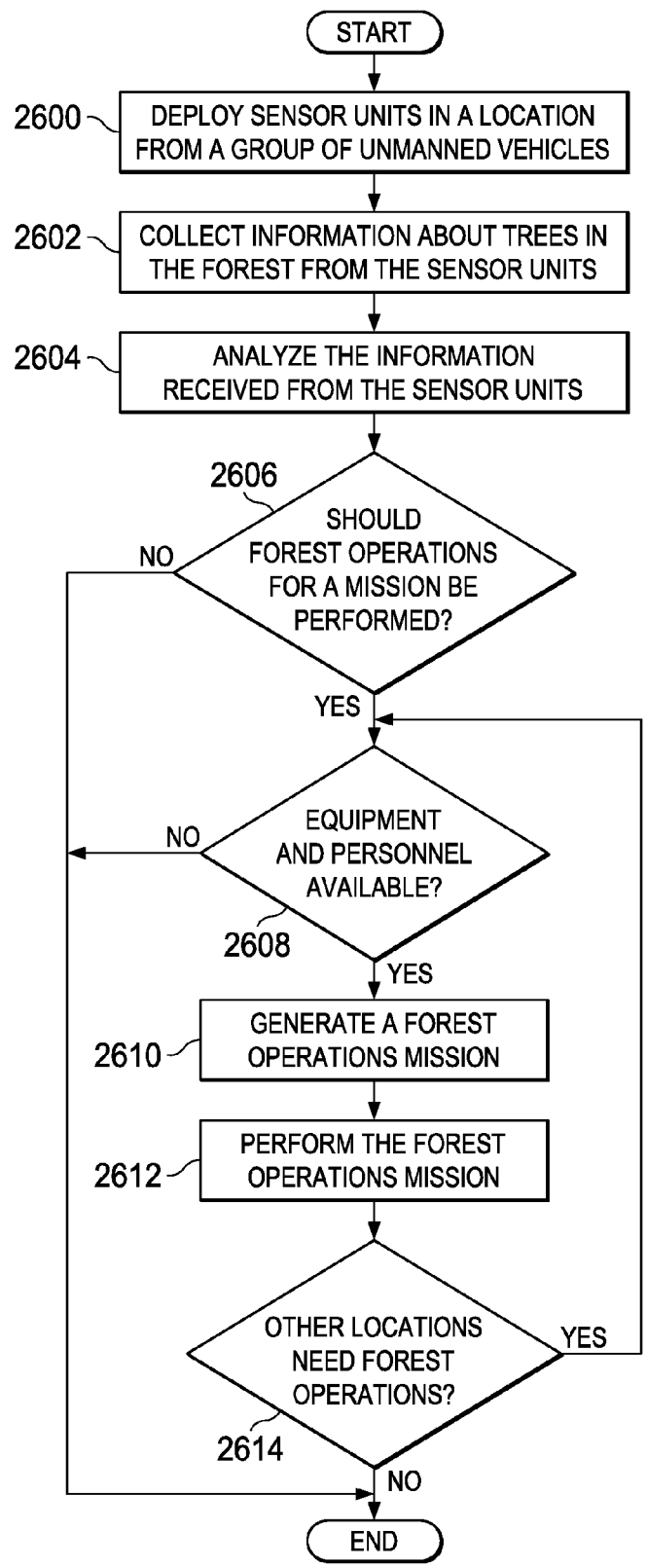
FIG. 26 is an illustration of a flowchart of a decision making process for generating and performing forest operations in a mission in accordance with an illustrative embodiment.

With reference now to FIG. 26, an illustration of a flowchart of a decision making process for generating and performing forest operations in a mission is depicted in accordance with an illustrative embodiment. The process illustrated in FIG. 26 is an example of operations that may be performed by decision making process 1800 in FIG. 18 when implemented in forestry manager 1014 in FIG. 10. Further, the process illustrated in this figure may be used by assets 1016 to perform missions 1030 in FIG. 10.

The process begins by deploying sensor units in a location from a group of unmanned vehicles (operation 2600). The location may be location 1006 in forest 1002 in FIG. 10. The location may be a location in the forest in which forest operations may be performed. The sensor units deployed by the group of unmanned vehicles may be soil sensor units or other types of sensor units, depending on the particular implementation. The group of unmanned vehicles may be low-flying unmanned aerial vehicles. In other illustrative examples, the group of unmanned vehicles may include unmanned ground vehicles and other suitable types of vehicles.

Next, the process collects information about trees in the forest from the sensor units (operation 2602). The information received from the sensor units is analyzed (operation 2604).

The process then determines if forest operations for a mission should be performed in a location in the forest (operations 2606). The forest operations may be one of inspection, core sampling, measuring, thinning, harvesting, and other suitable types of forest operations. If a forest operation should be performed, the process then determines if equipment and personnel are available to perform the forest operation (operation 2608). If equipment and personnel are available, the process generates a forest operations mission (operation 2610). The forest operations mission may include tasks for each of assets 1016 to perform. For example, with harvesting, the forest operations mission may specify tasks to be performed by harvesting equipment and forestry personnel.

Next, the forest operations mission is performed (operation 2612). A determination is then made as to whether other locations in the forest need forest operations to be performed (operation 2614).

If other locations of the forest need forest operations to be performed, the process returns to operation 2608 as described above. Otherwise, the process terminates.

With reference again to operation 2606, if forest operations should not be performed, the process terminates. Returning to operation 2608, if equipment and personnel are not available to perform the forest operation, the process also terminates.

Thus, the illustrative embodiments provide a means of measuring soil conditions over vast areas at low cost by utilizing remote sensors and autonomous systems. In particular, the system may improve productivity of reforestation activities by reducing costs and improving seedling yield through greater optimization of reforestation parameters. This optimization may be enabled by more accurate soil moisture and temperature data prior to and at the time of planting. The automated system makes this data available to computer programs and analysts in a timely and cost effective manner.

With the use of an illustrative embodiment, soil conditions are available in real time to aid in decision making. Information may be used to determine timing of planting, seedling type selection, and selection of planting density for reforestation operations. The sensor units deployed by the unmanned aerial vehicles and other types of unmanned vehicles may monitor conditions after the initial planting of trees in the forest to determine locations in the forest that should be in-filled due to poor initial growth conditions or high seedling mortality rates.

Although the illustrative embodiments have been described with regard to artificial regeneration by planting and replanting trees in a forest, the illustrative embodiments may also apply to natural regeneration of trees in the forest. For example, the illustrative embodiments may be used to monitor conditions and provide information about root suckering, stump sprouting, natural seedlings, or other suitable indications of natural regeneration of the forest. Further, when an illustrative embodiment is used for planting or replanting trees in a forest, the illustrative embodiments may aid in planting using seedlings, machine planting, hand planting, or some other suitable type of artificial regeneration of the forest.

Additionally, although the illustrative embodiments have been described as being used for forestry management operations, the forestry management system may also be applied to the management of a number of other domains. These domains may include precision agriculture, hydrological research, and monitoring soil salt levels due to human activity, large scale construction such as open pit mining, and other suitable activities.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 27, an illustration of a block diagram of a data processing system is depicted in accordance with an illustrative embodiment. Data processing system 2700 may be used to implement computer system 210 in FIG. 2, controller 610 in FIG. 6, identifier 810 in FIG. 8, and other suitable devices within forestry management environment 200.

In this illustrative example, data processing system 2700 includes communications framework 2702, which provides communications between processor unit 2704, memory 2706, persistent storage 2708, communications unit 2710, input/output unit 2712, and display 2714. In this example, communication framework may take the form of a bus system.

Processor unit 2704 serves to execute instructions for software that may be loaded into memory 2706. Processor unit 2704 may be a number of processors, a multi-processor core, or some other type of processor, depending on the particular implementation.

Memory 2706 and persistent storage 2708 are examples of storage devices 2716. A storage device is any piece of hardware that is capable of storing information, such as, for example, without limitation, data, program code in functional form, and/or other suitable information either on a temporary basis and/or a permanent basis. Storage devices 2716 may also be referred to as computer readable storage devices in these illustrative examples. Memory 2706, in these examples, may be, for example, a random access memory or any other suitable volatile or non-volatile storage device. Persistent storage 2708 may take various forms, depending on the particular implementation.

For example, persistent storage 2708 may contain one or more components or devices. For example, persistent storage 2708 may be a hard drive, a flash memory, a rewritable optical disk, a rewritable magnetic tape, or some combination of the above. The media used by persistent storage 2708 also may be removable. For example, a removable hard drive may be used for persistent storage 2708.

Communications unit 2710, in these illustrative examples, provides for communications with other data processing systems or devices. In these illustrative examples, communications unit 2710 is a network interface card.

Input/output unit 2712 allows for input and output of data with other devices that may be connected to data processing system 2700. For example, input/output unit 2712 may provide a connection for user input through a keyboard, a mouse, and/or some other suitable input device. Further, input/output unit 2712 may send output to a printer. Display 2714 provides a mechanism to display information to a user.

Instructions for the operating system, applications, and/or programs may be located in storage devices 2716, which are in communication with processor unit 2704 through communications framework 2702. The processes of the different embodiments may be performed by processor unit 2704 using computer-implemented instructions, which may be located in a memory, such as memory 2706.

These instructions are referred to as program code, computer usable program code, or computer readable program code that may be read and executed by a processor in processor unit 2704. The program code in the different embodiments may be embodied on different physical or computer readable storage media, such as memory 2706 or persistent storage 2708.

Program code 2718 is located in a functional form on computer readable media 2720 that is selectively removable and may be loaded onto or transferred to data processing system 2700 for execution by processor unit 2704. Program code 2718 and computer readable media 2720 form computer program product 2722 in these illustrative examples. In one example, computer readable media 2720 may be computer readable storage media 2724 or computer readable signal media 2726.

In these illustrative examples, computer readable storage media 2724 is a physical or tangible storage device used to store program code 2718 rather than a medium that propagates or transmits program code 2718.

Alternatively, program code 2718 may be transferred to data processing system 2700 using computer readable signal media 2726. Computer readable signal media 2726 may be, for example, a propagated data signal containing program code 2718. For example, computer readable signal media 2726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2700 are not meant to provide architectural limitations to the manner in which different embodiments may be implemented. The different illustrative embodiments may be implemented in a data processing system including components in addition to and/or in place of those illustrated for data processing system 2700. Other components shown in FIG. 27 can be varied from the illustrative examples shown. The different embodiments may be implemented using any hardware device or system capable of running program code 2718.

Thus, the illustrative embodiments provide a method and apparatus for managing a forest. In the illustrative examples, a forestry management system may gather information about a forest from autonomous vehicles and analyze that information more efficiently than currently used systems in which human operators collect information about a forest.

Further, the illustrative embodiments also generate missions based on a current state of the forest as well as from user input. These missions may be sent to one or more autonomous vehicles. These missions may include information gathering or state changes to be implemented in the forest. Information gathering may be performed for various purposes in managing the forest. These purposes include maintaining a health of the forest, identifying inventory in the forest, identifying safety risks in the forest, identifying illegal activities in the forest, and other purposes. The effect of changing states in the forest may include fighting fires, pest control, harvesting, and other suitable state changes.

With the use of autonomous vehicles and the capability of having autonomous vehicles cooperate with each other in performing tasks in a swarm, the illustrative examples provide more efficient mechanisms for collecting information, affecting changes, or a combination thereof with respect to a forest.

Further, the use of autonomous vehicles and sensor systems in the illustrative embodiments may allow for a desired level of sampling of information from a sufficient number of locations to obtain results that are more accurate than currently possible. The illustrative embodiments also allow for action to be taken in response to the results that may be more timely and accurate than currently possible.

Further, the illustrative embodiments may avoid issues that result from interpretations of observations made by personnel to generate information about the forest. The use of at least one of unmanned vehicles and sensor systems in the illustrative embodiments results in information being generated in a manner that is less subjective as compared to how information is generated by personnel in the forest.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A forestry management system comprising:
a forestry manager configured to:
receive information relating to a number of soil conditions for a location in a forest from a sensor system deployed by a group of aerial vehicles and
identify a mission based on the number of soil conditions,
wherein the sensor system comprises sensor units having a housing and pins weighted such that the pins penetrate a ground to generate the information from soil in the location;
wherein the pins include exposed portions and insulated portions such that the insulated portions localize measurements taken by the exposed portions at a desired depth under a surface of the ground;
wherein moisture is determined based on a measurement of a resistance between the exposed portions of the pins;
wherein the insulated portions localize the measurement of the resistance at the desired depth under the surface of the ground;
wherein the pins include a temperature sensor; and
wherein the sensor units comprise at least one of recoverable sensor units or disposable soil sensor units, the disposable soil sensor units configured to be deployed and not retrieved having housing comprised of material that is biodegradable.

2. The forestry management system of claim 1, wherein the mission is selected from at least one of a harvesting mission, a planting mission, a soil condition identification mission, a fire condition warning mission, a forest maintenance mission, or a forest inventory mission.

3. The forestry management system of claim 1, wherein the forestry management system is configured to coordinate operation of assets to perform the mission.

4. The forestry management system of claim 1, wherein the sensor system comprises:
a number of ground-based sensor units configured to generate the information from the soil in the location.

5. The forestry management system of claim 4, wherein the sensor system further comprises:
a base station configured to receive the information from the number of ground-based sensor units and send the information to the forestry manager.

6. The forestry management system of claim 5, wherein the base station is configured to send the information to the forestry manager through the group of aerial vehicles.

7. The forestry management system of claim 4, wherein a ground-based sensor unit in the number of ground-based sensor units is configured to generate information about a location of the ground-based sensor unit, a trajectory of the ground-based sensor unit, and an orientation of the ground-based sensor unit.

8. The forestry management system of claim 1, wherein an aerial vehicle in the group of aerial vehicles is selected from one of an unmanned aerial vehicle and a manned aerial vehicle.

9. The forestry management system of claim 1, wherein the number of soil conditions comprises moisture, a temperature, conductivity, nitrogen content, pH, calcium content, salt content, and a nutrient content.

10. A forestry management system comprising:
sensor units configured to be deployed in a location, generate information about a number of soil conditions in the location, and transmit the information using wireless communications links; and
a group of aerial vehicles configured to carry the sensor units and deploy the sensor units in the location,
wherein the sensor units have a housing and pins weighted such that the pins penetrate a ground to generate the information from soil in the location;
wherein the pins include exposed portions and insulated portions such that the insulated portions localize measurements taken by the exposed portions at a desired depth under a surface of the ground;
wherein moisture is determined based on a measurement of a resistance between the exposed portions of the pins;
wherein the insulated portions localize the measurement of the resistance at the desired depth under the surface of the ground;
wherein the pins include a temperature sensor; and
wherein the sensor units comprise at least one of recoverable sensor units or disposable soil sensor units, the disposable soil sensor units configured to be deployed and not retrieved having housing comprised of material that is biodegradable.

11. The forestry management system of claim 10, wherein the sensor units are configured to be air dropped from an aerial vehicle in the group of aerial vehicles into the location.

12. The forestry management system of claim 10 further comprising:
a base station configured to receive the information from the sensor units in the location over the wireless communications links and send the information to a remote location over another wireless communications link.

13. The forestry management system of claim 12, wherein the base station is powered by a solar power generation system.

14. The forestry management system of claim 10 further comprising:
a forestry manager configured to receive the information relating to the number of soil conditions for the location in a forest from the sensor units deployed by the group of aerial vehicles and identify a mission based on the number of soil conditions.

15. The forestry management system of claim 10, wherein an aerial vehicle in the group of aerial vehicles is selected from one of an unmanned aerial vehicle and a manned aerial vehicle.

16. A method for managing a location, the method comprising:
deploying soil sensor units in the location in a forest from a group of aerial vehicles;
generating information about a number of soil conditions in the location in the forest using the soil sensor units in the location; and
transmitting the information from the soil sensor units to a remote location for analysis,
wherein the soil sensor units have a housing and pins weighted such that the pins penetrate a ground to generate the information from soil in the location;
wherein the pins include exposed portions and insulated portions such that the insulated portions localize measurements taken by the exposed portions at a desired depth under a surface of the ground;
wherein moisture is determined based on a measurement of a resistance between the exposed portions of the pins;
wherein the insulated portions localize the measurement of the resistance at the desired depth under the surface of the ground;
wherein the pins include a temperature sensor; and
wherein the sensor units comprise at least one of recoverable sensor units or disposable soil sensor units, the disposable soil sensor units configured to be deployed and not retrieved having housing comprised of material that is biodegradable.

17. The method of claim 16 further comprising:
identifying a number of missions using the information about the number of soil conditions, wherein the number of missions is selected from at least one of a harvesting mission, a planting mission, a soil condition identification mission, a fire condition warning mission, a forest maintenance mission, or a forest inventory mission.

18. The method of claim 16, wherein the transmitting step comprises:
transmitting the information from the soil sensor units to at least one of an unmanned aerial vehicle, a manned ground vehicle, or a control station.

19. The method of claim 18, wherein the transmitting step comprises:
transmitting the information from the soil sensor units to a transceiver; and
transmitting the information from the transceiver to at least one of the unmanned aerial vehicle, the manned ground vehicle, or the control station.

20. The method of claim 16, wherein the number of soil conditions comprises moisture, a temperature, conductivity, nitrogen content, pH, calcium content, salt content, and a nutrient content.

* * * * *